United States Patent
Ibrahim et al.

(10) Patent No.: US 12,081,482 B1
(45) Date of Patent: Sep. 3, 2024

(54) CSI-RS CONFIGURATION FOR SBFD

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/171,064

(22) Filed: Feb. 17, 2023

(51) Int. Cl.
*H04L 5/00* (2006.01)
*H04L 1/00* (2006.01)
*H04L 5/14* (2006.01)
*H04L 27/26* (2006.01)

(52) U.S. Cl.
CPC .......... *H04L 5/0051* (2013.01); *H04L 1/0068* (2013.01); *H04L 5/14* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 2023/0106194 A1* | 4/2023 | Rudolf | H04W 74/006 370/329 |
| 2023/0209483 A1* | 6/2023 | Rudolf | H04W 72/0446 370/503 |
| 2023/0328656 A1* | 10/2023 | Rudolf | H04W 52/325 455/522 |
| 2023/0421222 A1* | 12/2023 | Chatterjee | H04W 76/20 |

* cited by examiner

*Primary Examiner* — Diane L Lo
(74) *Attorney, Agent, or Firm* — Norton Rose Fulbright US LLP

(57) ABSTRACT

This disclosure provides systems, methods, and devices for wireless communication that support (CSI-RS) configuration enhancements for subband full-duplex (SBFD) operations. In a first aspect, a device for wireless communication includes at least one processor and a memory coupled to the at least one processor. The at least one processor is configured to receive a control channel transmission including CSI-RS resource configuration information from a second network node. The at least one processor is further configured to receive, in a SBFD slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink subbands of the SBFD slot. Other aspects and features are also claimed and described.

27 Claims, 13 Drawing Sheets

Sub-band Full Duplex

In-band Full Duplex (partial overlap)

In-band Full Duplex (full overlap)

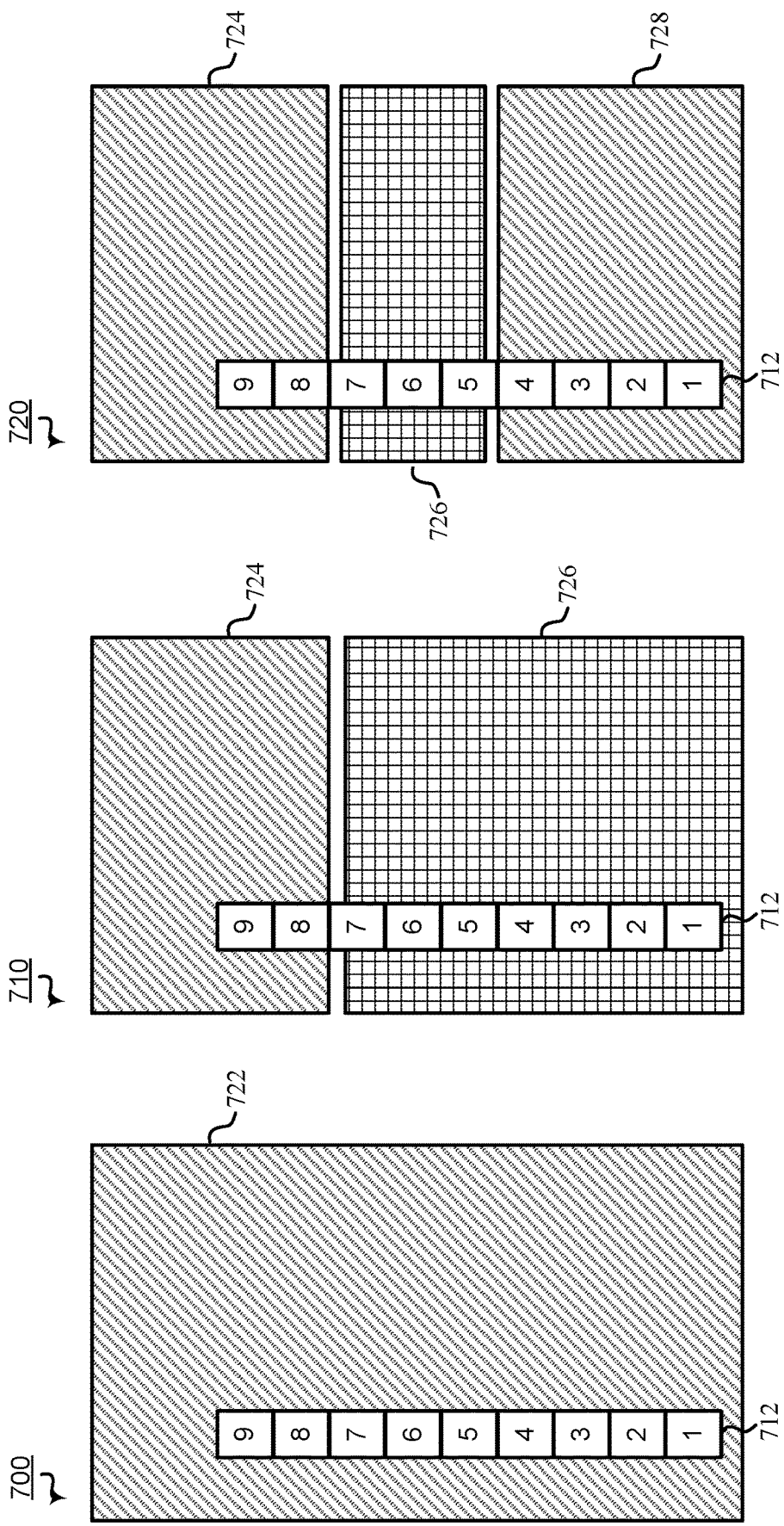

CSI-RS CONFIGURATION FOR SBFD

TECHNICAL FIELD

Aspects of the present disclosure relate generally to wireless communication systems, and more particularly, to channel state information reference signal (CSI-RS) configuration enhancements for subband full-duplex (SBFD) operations. Some features may enable and provide improved communications, including support of CSI-RS transmissions with resources in two or more downlink subbands and enabling of advanced CSI-RS resource allocations to account for SBFD operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving a control channel transmission including channel state information reference signal (CSI-RS) resource configuration information from a second network node; and receiving, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, an apparatus includes at least one processor and a memory coupled to the at least one processor. The at least one processor is configured to receive a control channel transmission including channel state information reference signal (CSI-RS) resource configuration information from a second network node; and to receive, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, an apparatus includes means for receiving a control channel transmission including channel state information reference signal (CSI-RS) resource configuration information from a second network node; and means for receiving, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, a non-transitory computer-readable medium stores instructions that, when executed by a processor, cause the processor to perform operations. The operations include receiving a control channel transmission including channel state information reference signal (CSI-RS) resource configuration information from a second network node; and receiving, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In another aspect of the disclosure, a method for wireless communication includes transmitting a control channel transmission including channel state information reference signal (CSI-RS) resource configuration information from a second network node; and transmitting, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, an apparatus includes at least one processor and a memory coupled to the at least one processor. The at least one processor is configured to transmit a control channel transmission including channel state information reference signal (CSI-RS) resource configuration information from a second network node; and to transmit, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, an apparatus includes means for transmitting a control channel transmission including channel state information reference signal (CSI-RS) resource configuration information from a second network node; and means for transmitting, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

In an additional aspect of the disclosure, a non-transitory computer-readable medium stores instructions that, when executed by a processor, cause the processor to perform operations. The operations include transmitting a control channel transmission including channel state information reference signal (CSI-RS) resource configuration information from a second network node; and transmitting, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 7A, 7B, and 7C are block diagrams illustrating example CSI resource configurations that support enhanced CSI SBFD operations according to one or more aspects.

Like reference numbers and designations in the various drawings indicate like elements.

DETAILED DESCRIPTION

Figure 1:
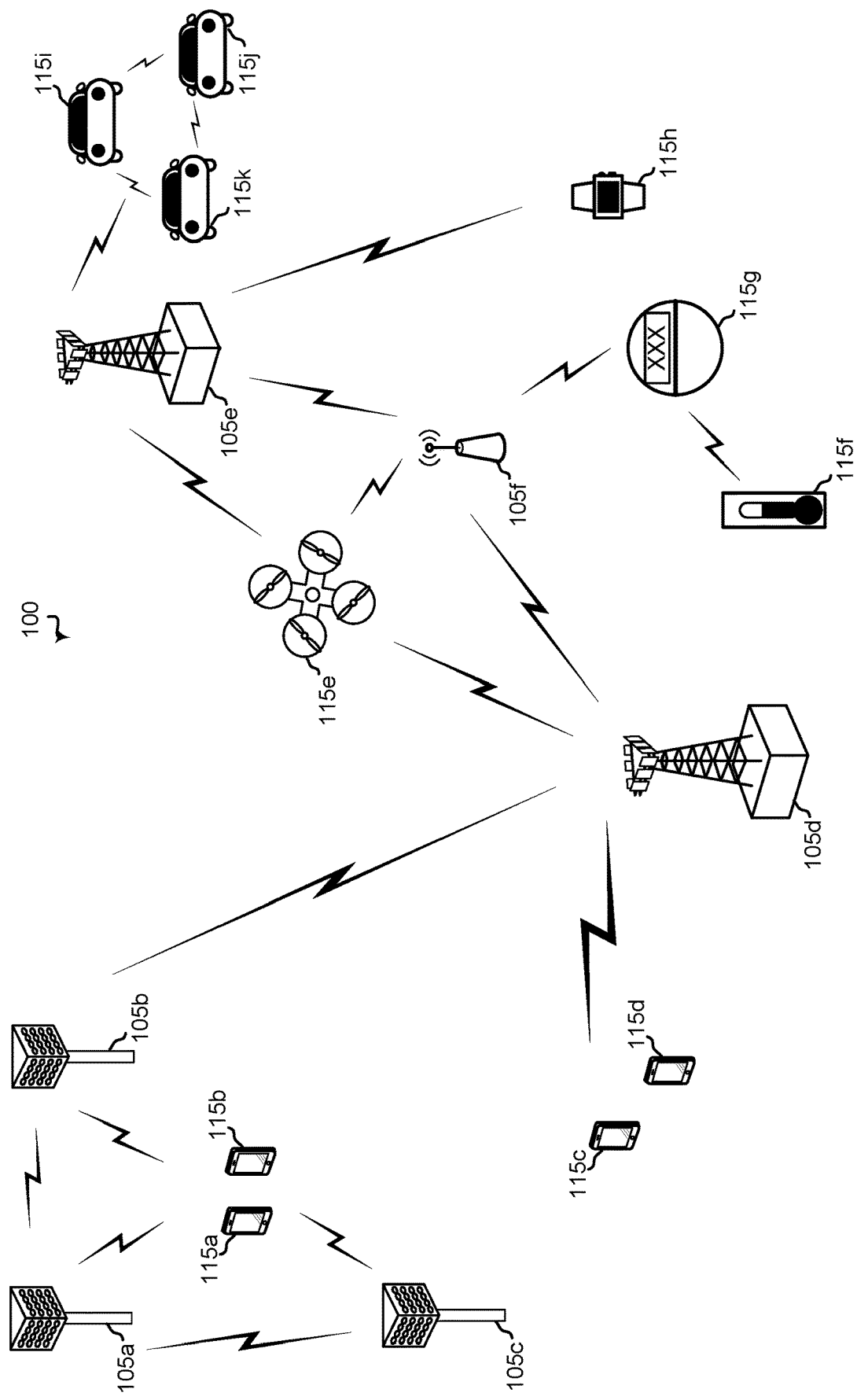
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
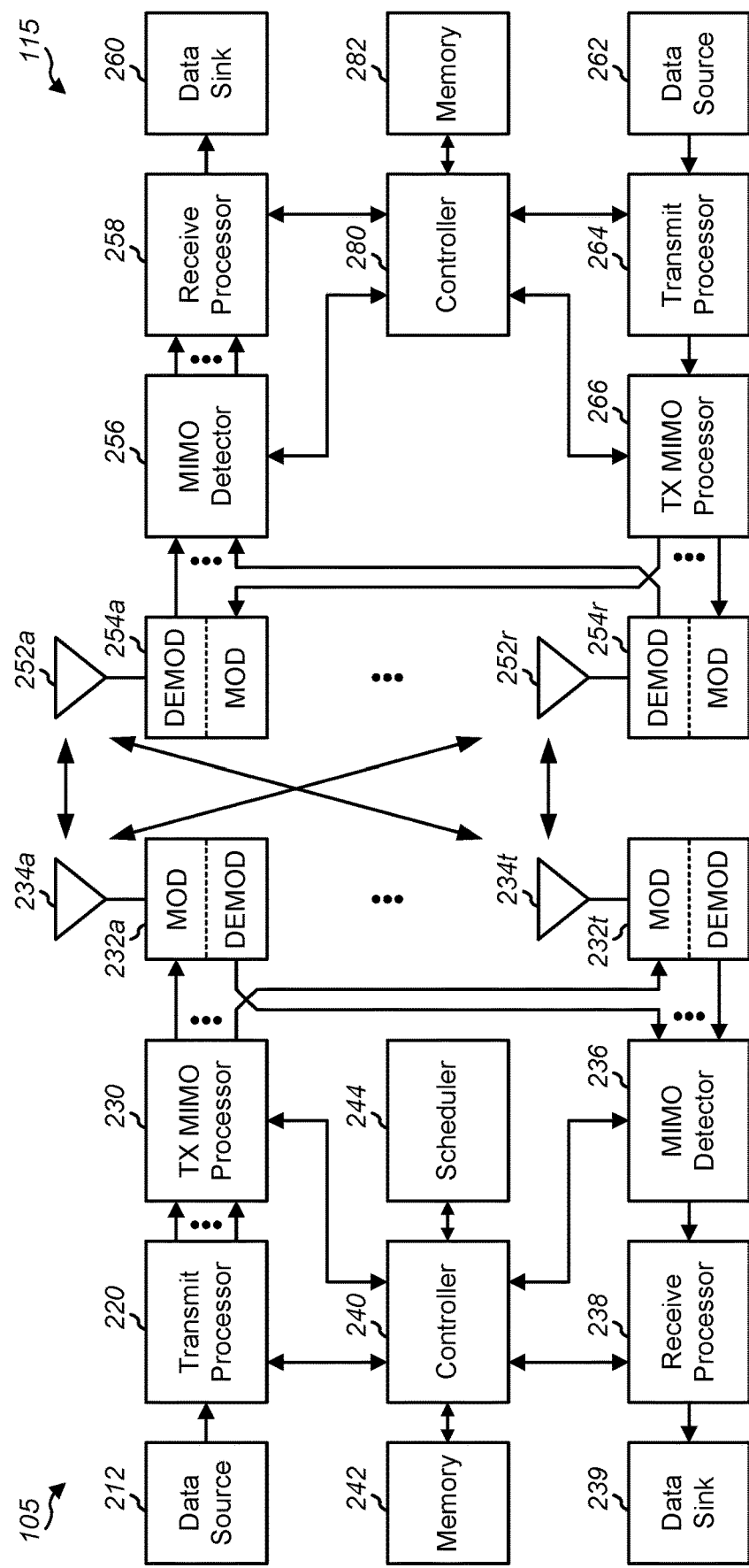
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4-13, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figures 3A, 3B:
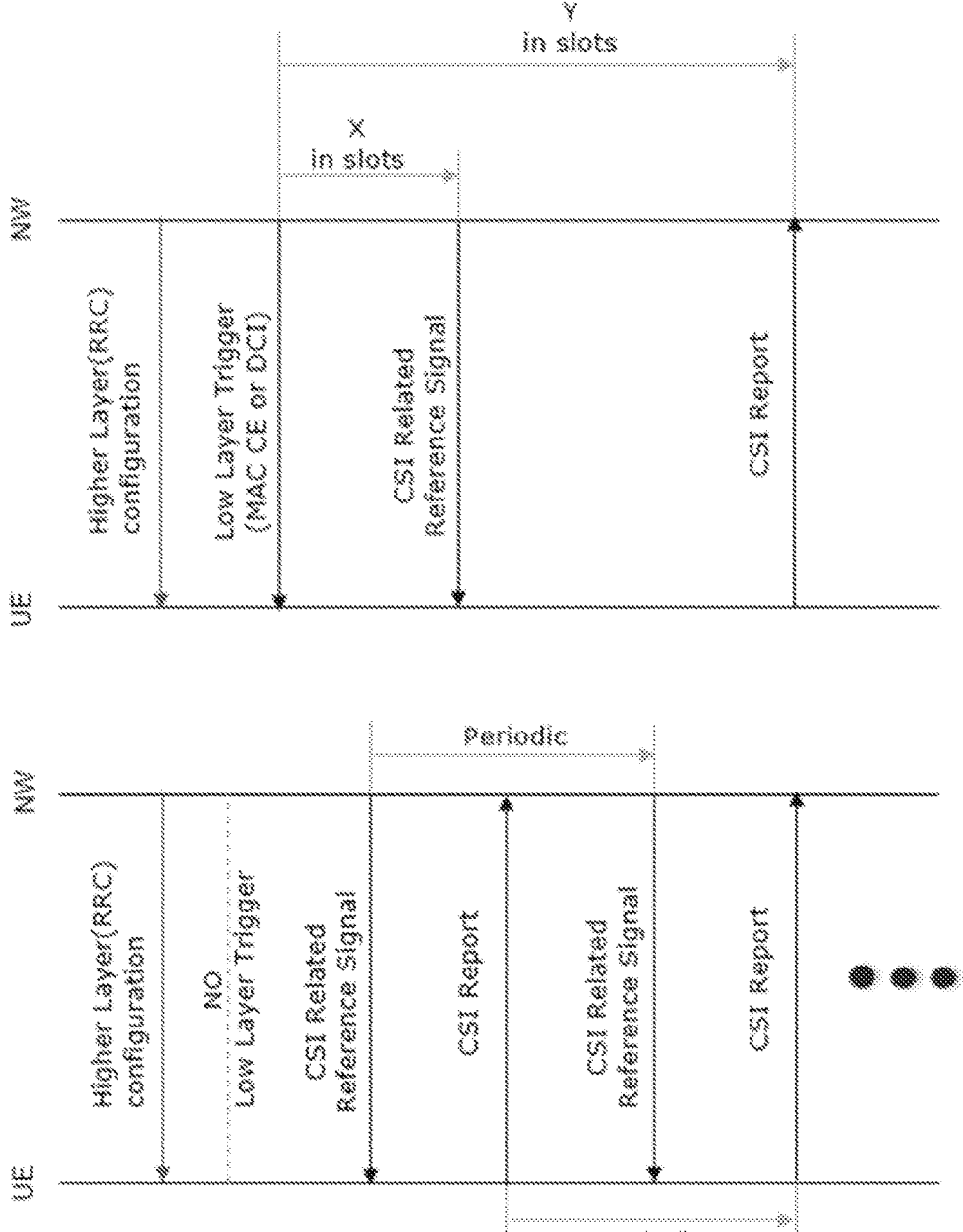
FIG. 3A is a ladder diagram of an example of periodic CSI-RS triggering according to one or more aspects.
FIG. 3B is a ladder diagram of an example of aperiodic CSI-RS triggering according to one or more aspects.

FIGS. 3A and 3B illustrate examples of CSI-RS operations for different CSI-RS scheduling schemes. In FIG. 3A periodic scheduling operations are shown, and in FIG. 3B aperiodic scheduling operations are shown.

Periodic scheduling operations correspond to scheduling multiple transmissions with a single setup, often by a single message. Aperiodic scheduling operations correspond to scheduling (e.g., triggering) a single item with a single transmission/message. A third option, semi-persistent scheduling, can be regarded as a kind of mix of Periodic and Aperiodic scheduling. The first cycle in semi-persistent scheduling would be similar to Aperiodic scheduling, but once the first cycle is triggered by a single transmission/message, CSI-RS transmissions and CSI Reports would happen periodically.

Referring to FIG. 3A, the diagram 300 illustrates two devices, a UE and a network device (NW) and illustrates communications between the two devices. FIG. 3A further illustrates a timing between transmissions exchanged by the two devices. In the example illustrated in FIG. 3A, the network (NW) transmits a higher layer configuration message, such as an RRC message. The RRC message configures and schedules multiple CSI-RS transmissions with a particular periodicity, as illustrated in FIG. 3A.

The periodicity shown in FIG. 3A is configured by the RRC message. Depending on the physical channel and report periodicity type, a different RRC parameter may be used for indicating the periodicity. For example, a reportSlotConfig IE or a reportSlotOffsetList IE may be used to indicate the periodicity. The reportSlotConfig IE may be used for CSI reporting in PUCCH, and the reportSlotOffsetList IE may be used for CSI reporting in PUSCH.

The network transmits the multiple CSI-RS transmissions to the UE according to the periodicity and without a lower layer, such as MAC or physical layer, triggering transmission. After receiving the CSI-RS transmissions, the UE generates a CSI report and transmits the CSI report to the network according to the periodicity. These operations may continue until the network reconfigures the CSI-RS scheduling scheme, such as by transmitting another higher layer message or transmitting a lower layer message.

Referring to FIG. 3B, the diagram 310 illustrates two devices, a UE and a network device (NW) and illustrates communications between the two devices. FIG. 3B further illustrates timings between transmissions exchanged by the two devices. In the example illustrated in FIG. 3B, the network (NW) transmits a higher layer configuration message, such as an RRC message, to the UE. The RRC message configures CSI-RS transmissions for aperiodic triggering, as illustrated in FIG. 3B. For example, the RRC message includes an aperiodicTriggeringOffset IE, which includes a standard set of CSI-RS offset values for which the UE should or must use. To illustrate, the UE may have to universally use such an IE for particular operating modes and may not conditionally use the IE based on UE capabilities, UE configurations, or UE conditions.

After configuration, the network may occasionally, transmit a lower layer message (e.g., trigger message) which schedules/triggers individual CSI-RS transmissions, and optionally, the corresponding CSI report. In the example of FIG. 3B, the network device transmits a DCI, a MAC CE, or both, to trigger a CSI-RS transmission and a corresponding CSI report. Such triggering transmissions may be sent in/via a PDCCH transmission.

The triggering offsets shown in FIG. 3B is X slots for the CSI-RS transmission and Y slots for the corresponding CSI report as measured from the lower layer message (e.g., trigger message). The aperiodic CSI-RS timing offset X refers to the time gap between aperiodic CSI-RS triggering and the aperiodic CSI-RS transmission with regard to the number of slots. The aperiodic CSI reporting timing offset Y refers to the time gap between aperiodic CSI reporting triggering and aperiodic CSI reporting with regard to the number of slots. The aperiodic CSI-RS timing offsets X and Y in this illustration may be defined as in TS 38.331.

The UE determines the aperiodic CSI-RS timing offset X based on the aperiodicTriggeringOffset IE. To illustrate, the UE determines an indicator from the lower layer message and uses the indicator to identify an entry of the aperiodicTriggeringOffset IE. A value of the entry of the aperiodicTriggeringOffset IE corresponds to the value for X. The UE then monitors the particular slot for the CSI-RS transmission from the network device.

After receiving the CSI-RS transmission, the UE generates a CSI report and transmits the CSI report to the network. The aperiodic CSI-RS timing offset Y may be determined similar to the aperiodic CSI-RS timing offset X. The UE may use the aperiodicTriggeringOffset IE to determine offset values until the network reconfigures the CSI-RS offset values, such as by transmitting another higher layer message or transmitting a lower layer message. Although the examples of FIGS. 3A and 3B described aperiodic and periodic CSI-RS and/or report signaling, in other examples, the signaling may be semi-periodic/semi-persistent. For example, similar to aperiodic and periodic, semi-persistent CSI-RS and/or report signaling may include higher layer (e.g., RRC) configuration, but may utilize lower layer (e.g., MAC CE or DCI) signaling for activation and deactivation of multiple CSI-RS and/or reports.

Figure 3E:
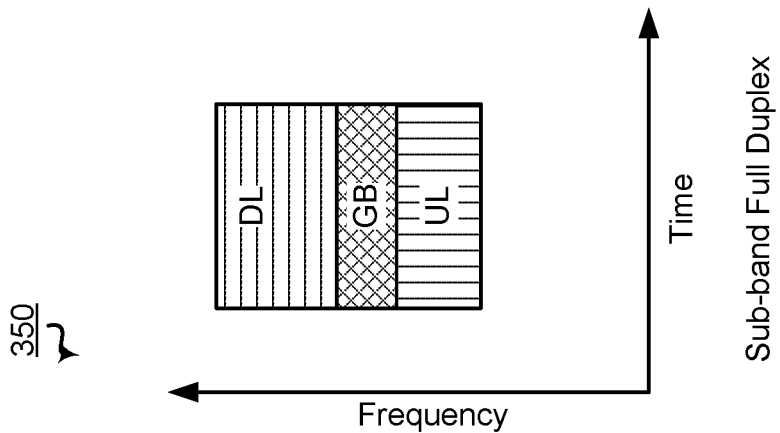
FIG. 3E is a diagram of a third example of full-duplex operations according to one or more aspects.
Figure 3D:
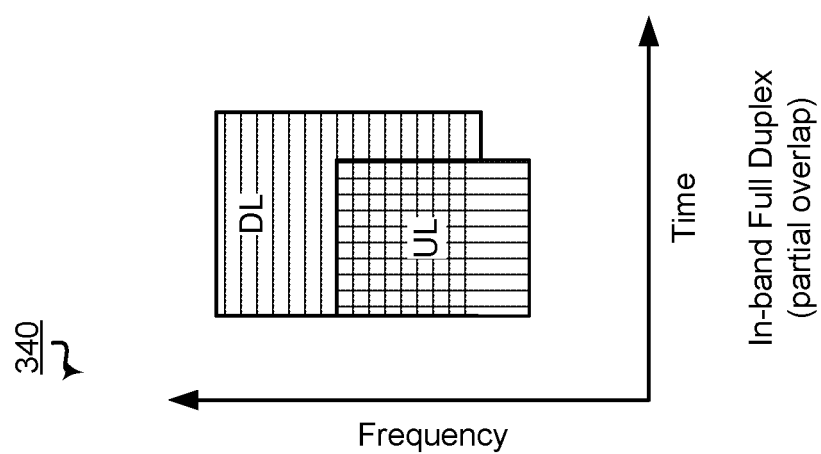
FIG. 3D is a diagram of a second example of full-duplex operations according to one or more aspects.
Figure 3C:
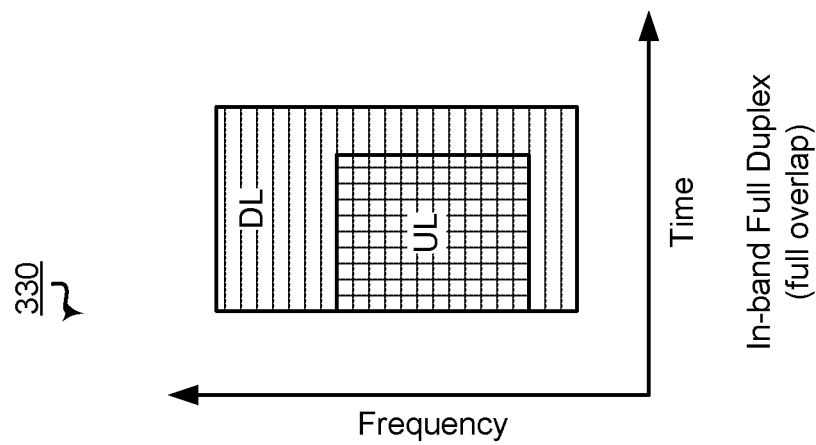
FIG. 3C is a diagram of a first example of full-duplex operations according to one or more aspects.

FIGS. 3C, 3D, and 3E illustrate examples of full-duplex communication operations. In FIGS. 3C and 3D, in-band full-duplex (IBFD) operations are shown, and in FIG. 3F subband full-duplex operations are shown. In FIGS. 3C, 3D, and 3E transmission or channel bandwidths are illustrated for a slot and include uplink bands (cross-hatching), downlink bands (horizontal hatching), guardbands (angled cross-hatching), or a combination thereof. The bands may be referred to as subbands of the slot or bandwidth, as multiple subbands may be included in each slot.

In-band full-duplex (IBFD) operation corresponds to transmitting and receiving on the same time and frequency resources. As shown in diagrams 330 and 340 of FIGS. 3C and 3D, the downlink and uplink resources share the same time and frequency resource. The downlink and uplink resources may fully or partially overlap, as shown in FIGS. 3C and 3D respectively. Subband full-duplex operation, often referred to as frequency division duplexing (FDD) or flexible duplex, corresponds to transmitting and receiving data at the same time but on different frequency resources. As shown in diagram 350 of FIG. 3E, the downlink resource is separate from the uplink resource by a relatively "thin" guardband. The guardband in FIG. 3E is enlarged for illustrative purposes. The guardband is what generally distinguishes SBFD from paired spectrum (e.g., IBFD) in current wireless standard specifications.

The present disclosure describes enhanced CSI-RS resource determination, such as conditional usage of allocated CSI-RS resources for NZP-CSI-RS, ZP-CSI-RS, CSI-IM, or a combination thereof, when operating in FD modes as shown in FIGS. 3C, 3D, and 3F. Such enhanced CSI-RS resource determination can alleviate interoperability issues (e.g., backward compatibility issues) that may arise and can improve performance in some operating modes and/or under certain conditions. Thus, a UE configured with enhanced CSI-RS resource determination may have increased flexibility and performance as compared to conventional UEs.

Figure 4:
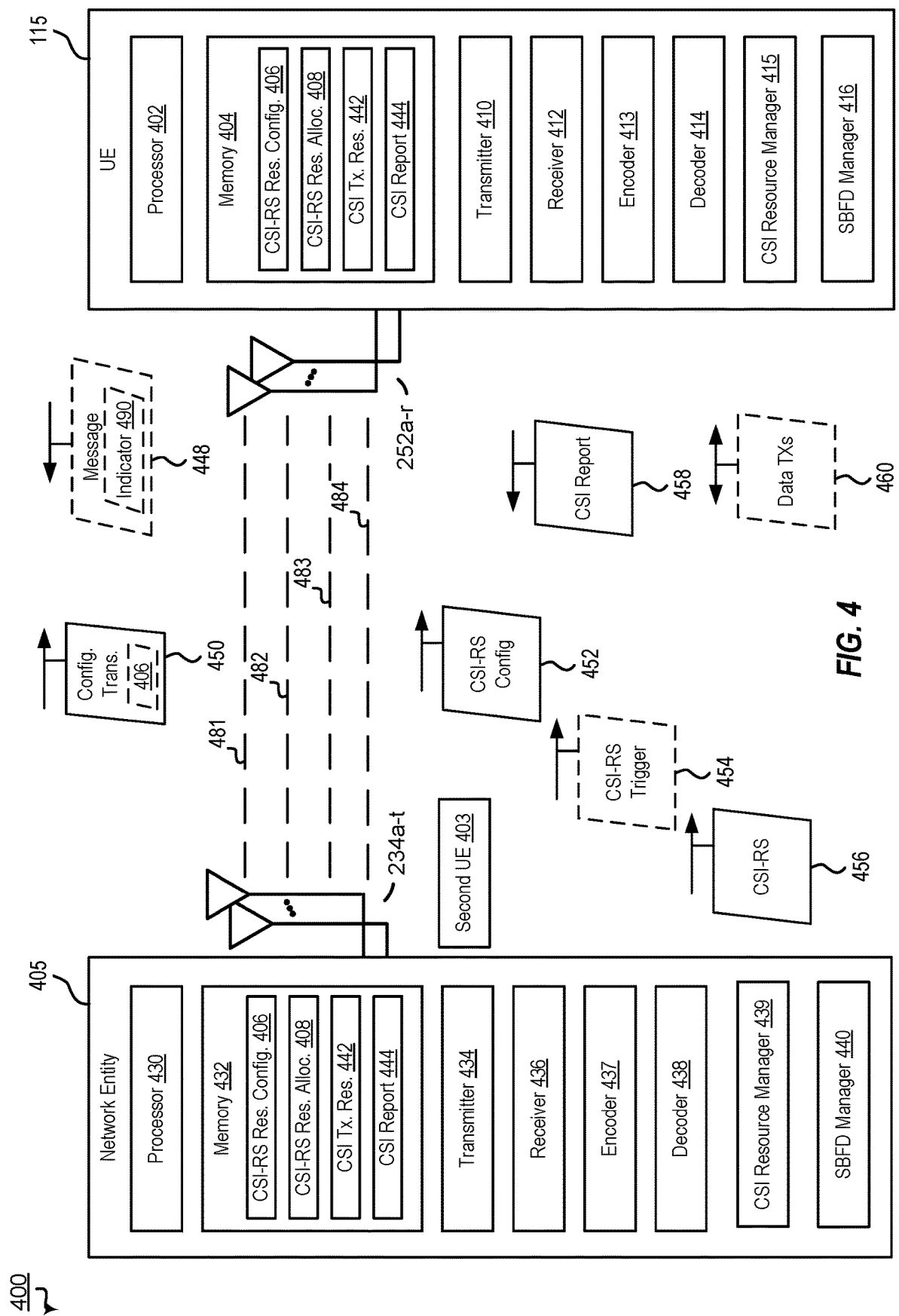
FIG. 4 is a block diagram illustrating an example wireless communication system that supports enhanced CSI SBFD operations according to one or more aspects.

FIG. 4 illustrates an example of a wireless communications system 400 that supports enhanced CSI-RS resource configuration and operations in accordance with aspects of the present disclosure. In some examples, wireless communications system 400 may implement aspects of wireless communication system 100. For example, wireless communications system 400 may include a network, such as one or more network entities, and one or more UEs, such as UE 115 (also referred to as a first UE) and second UE 403. As illustrated in the example of FIG. 4, the network entity includes a corresponds to a base station, such as base station 105. Alternatively, the network entity may include or correspond to a different network device (e.g., not a base station). Enhanced CSI-RS resource configuration may enable more flexible CSI-RS resource allocations for certain operating modes and reduce CSI-RS resource errors. These improvements may reduce latency and increase throughput by improving connection quality and reducing interference and failures. Accordingly, network and device performance can be increased. As referred to herein the CSI-RS may include or correspond to non-zero power CSI-RS (NZP-CSI-RS), non-zero power CSI-RS (ZP-CSI-RS), or CSI interference measurement (CSI-IM).

Base station 105, UE 115, and second UE 403 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. Base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, or a Bandwidth Part (BWP) ID. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management or BWP switching functionality. In some implementations, two or more CCs are quasi co-located, such that the CCs have the same beam and/or same symbol.

In some implementations, control information may be communicated via base station 105, UE 115, and second UE 403. For example, the control information may be communicated suing MAC-CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can include processor 402, memory 404, transmitter 410, receiver 412, encoder, 413, decoder 414, CSI resource manager 415, SBFD manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store CSI-RS resource configuration information 406, CSI-RS resource allocation information 408, CSI-RS transmission resource information 442 (e.g., CSI-RS transmission resource information), CSI report information 444, settings data, or a combination thereof, as further described herein.

The CSI-RS resource configuration information 406 (e.g., CSI-RS configuration information or CSI configuration information) includes or corresponds to data associated with or corresponding to configurations and resources for CSI-RS operations, including CSI-RS transmission and reporting. For example, the CSI-RS resource configuration information 406 may include configuration information for NZP-CSI-RS, ZP-CSI-RS, and/or CSI-IM. The CSI-RS resource configuration information 406 may include information for one or more settings or parameters for CSI-RS operations of a component carrier, channel, and/or cell. For example, the CSI-RS resource configuration information 406 may include CSI-RS RBG size information, CSI-RS transmission type information, slot type information, etc., per channel or channel group. In some implementations, the CSI-RS resource configuration information 406 includes or indicates the CSI-RS resource allocation information 408.

The resource allocation information 408 (e.g., CSI resource allocation information) includes or corresponds to data associated with or corresponding to bandwidth resources allocated for CSI transmissions or measurements for certain operating modes. For example, the resource allocation information 408 may include resource block data indicating resources designated for CSI operations for a certain operating mode and/or bandwidth. To illustrate, the resource allocation information 408 may indicate resource blocks for CSI transmissions or measurements for a particular bandwidth (e.g., 80 MHz and/or HD operation).

The resource block (RB) data may include data on physical layer resource elements, such as resource blocks or groups thereof. The resource block data may include a number of RB groups (RBGs) and/or an identification of RBGs (such as by an offset from a reference or core RBG (CRB0)). In some implementations, the resource block data is indicated by a bitmap which corresponds to RBGs of an active BWP. As explained in more detail below, the bitmap may correspond to an entirety of the RBGs of the BWP, or only to RBGs of the BWP with partially or fully overlap a corresponding transmission band (e.g., DL transmission band for DL BWP).

In other examples, the resource block data may include a starting resource block for a particular transmission and a quantity of resource block (e.g., continuous or contiguous RBs) for the particular transmission. In such implementations, the resource block data may be associated with or referred to as resource information or timing information. For example, a single indicator (e.g., a resource indicator value (RIV) or start and length indicator value (SLIV)) may be used to indicate both a starting RB (or RE) and a quantity (e.g., number or amount) of RBs (or REs).

In some implementations, the resource allocation information 408 further includes timing information, such as TDRA information. The timing information may be included in or indicated by a TDRA field. The timing information may indicate a particular slot for the transmission. For example, the TDRA field may indicate an offset in time or slots for a particular transmission and may be associated with other transmission information, such as FDRA information. The timing information may be used to determine a particular slot configuration, through identification of the slot and based on slot configuration information.

Additionally, or alternatively, the resource allocation information 408 may include resource block configuration information (such as resource block group configuration information also referred to as RB granularity or resolution). The resource block configuration information may include or correspond to values identifying or indicating a RBG size. The RBG size may include or correspond to a value identifying a quantity of RBs per group. Each BWP and/or subband may have its own RBG size, thus, the resource configuration data may include BWP or band specific RBG sizes. The resource allocation information 408 may include data received from the network (e.g., base station 105) and/or programmed into the memory 404. The resource allocation information 408 may be configured by RRC and/or modified by MAC-CE, DCI and/or other control signaling (e.g., broadcast spectrum control signaling).

The transmission resource information 442 (e.g., CSI-RS transmission resource information) includes or corresponds to data associated with or corresponding to resources allocated for a particular CSI event instance or CSI-RS transmission (or transmissions) in a slot. For example, the transmission resource information 442 may include resource block data indicating resources designated for CSI operations for a transmission bandwidth of a particular slot. To illustrate, the transmission resource information 442 may include or correspond to a subset of resources of the resource allocation information 408 as modified for the particular bandwidth configuration of the particular slot (e.g., for the DL subbands of the particular slot). In some implementations, some resources (e.g., RBs or RBGs) indicated by the resource allocation information 408 are removed (e.g., truncated or punctured) for overlapping with UL subbands or guardbands).

The CSI report information 444 includes or corresponds to data associated with or corresponding to a CSI report. The CSI report information 444 may be determined based on a CSI transmission or measurement in the modified resources of a particular slot. The CSI report information 444 may include or be used to indicate one or more of CQI (Channel Quality Information), PMI (Precoding Matrix Indicator), CRI (CSI-RS Resource Indicator), SSBRI (SS/PBCH Resource Block Indicator), LI (Layer Indicator), RI (Rank Indicator) an/or L1-RSRP.

The settings data includes or corresponds to data associated with enhanced CSI-RS resource configuration operations. The settings data may include one or more types of CSI-RS resource configuration modes and/or thresholds or conditions for switching between CSI-RS resource configuration modes. The CSI-RS resource configuration modes may include or correspond to in-band FD modes (e.g., partial and complete overlap modes), a SBFD mode, a NZP-CSI-RS mode, a ZP-CSI-RS mode, a CSI-IM mode, a CSI-RS, CSI-RS type modes (e.g., single and contiguous, single and non-contiguous, and dual non-contiguous), a single scrambling ID/sequence ID mode, a dual scrambling ID/sequence ID mode, etc. The thresholds or conditions may include or thresholds or conditions for CSI-RS RB granularity or resolution, such as a threshold indicating an amount of RBs in each group.

The settings data may include RBG size information, transmission type information, slot type information, channel bandwidth information, frequency band information, SCS information, bandwidth part (BWP) information, timing/scheduling information, etc. The transmission type information may include or correspond to information which indicates an operational mode or non-full-duplex slot format, uplink, downlink, sidelink, broadcast, etc. The slot type information may include information indicating a particular slot configuration, location and size of a band or subbands thereof, of multiple slots of a frame. For example, the slot type may include indications of UL, DL, and mixed, Full-duplex, slot configurations for each slot of a radio frame or subframe. Additionally, the slot type information may include multiple types of full-duplex configurations and subtypes. For example, the slot type information may include in-band non-overlapping (SBFD), partially overlapping, or fully overlapping configurations (as shown in FIGS. 3C-3E), and one or more sub-configurations for each type, such as shown in FIGS. 7A-9B. The BWP information includes or indicates one or more configured BWPs and an active BWP. The BWP information may further include or indicate a BWP size and placement for one or more of the configured BWPs.

The timing of a particular CSI-RS transmission or CSI measurement may occur after some delay or offset from a trigger transmission in some implementations. The settings data or CSI-RS resource configuration information 406 may include offset information (e.g., offset value data) indicating an offset (e.g., offset value) or a set of potential offsets (e.g., offset values). The offset values data may include or correspond to data associated with or corresponding to a standard set of CSI-RS offset values (e.g., Release 15 offset value or 7 offset values of $\{0, 1, 2, 3, 4, 16, 24\}$) or an extended set of CSI-RS offset values (e.g. include 18 values or 32 values). To illustrate, the extended offset values may include $\{0, 1, 2, 3, 4, 5, 6, \ldots, 15, 16, 24\}$ or $\{0, 1, 2, 3, 4, 5, 6, \ldots, 29, 30, 31\}$.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410 or receiver, 412 may include or correspond to one or more components of UE 115 described with reference to FIG. 2.

Encoder 413 and decoder 414 may be configured to encode and decode data for transmission. CSI resource manager 415 may be configured to perform CSI resource determination and optionally monitoring/estimation operations. For example, CSI resource manager 415 may be configured to determine an allocated set or sets of resources for CSI-RS transmissions or CSI estimation or monitoring. The CSI resource manager 415 may be further configured to modify the allocated set of resources to determine a subset of the allocated resources for a particular CSI-RS transmission or CSI evaluation. To illustrate, the CSI resource manager 415 may be configured to determine resource allocation information 408, transmission resource information 442, or both.

SBFD manager 416 may be configured to perform SBFD operations, such as CSI measurement and reporting operations for SBFD modes or slots. For example, SBFD manager 416 may be configured to determine a SBFD slot and configuration thereof. To illustrate, the SBFD manager 416 may determine which slots are SBFD and particular slot configurations for each SBFD slot.

Second UE 403 may include one or more elements similar to UE 115. In some implementations, the UE 115 and the second UE 403 are different types of UEs. For example, either UE may be a higher quality or have different operating constraints. To illustrate, one of the UEs may have a larger form factor or be a current generation device, and thus have more advanced capabilities and/or reduced battery constraints, higher processing constraints, etc.

Base station 105 includes processor 430, memory 432, transmitter 434, receiver 436, encoder 437, decoder 438, CSI resource manager 439, SBFD manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store CSI-RS resource configuration information 406, CSI-RS resource allocation information 408, CSI-RS transmission resource information 442 (e.g., CSI-RS transmission resource information), CSI report information 444, settings data, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs and/or base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434 or receiver, 436 may include or correspond to one or more components of UE 115 described with reference to FIG. 2.

Encoder 437, and decoder 438 may include the same functionality as described with reference to encoder 413 and decoder 414, respectively. CSI resource manager 439 may include similar functionality as described with reference to CSI resource manager 415. SBFD manager 440 may include similar functionality as described with reference to SBFD manager 416.

During operation of wireless communications system 400, the network (e.g., base station 105) may determine that UE 115 has enhanced CSI-RS resource configuration capability. For example, UE 115 may transmit a message 448 that includes an enhanced CSI-RS resource configuration indicator 490 (e.g., an enhanced CSI-RS resource configuration capability indicator). Indicator 490 may indicate enhanced CSI-RS resource configuration capability for one or more communication modes, such as HD, FD, IBFD, SBFD, etc. In some implementations, a network entity (e.g., a base station 105) sends control information to indicate to UE 115 that enhanced CSI-RS resource configuration operation and/or a particular type of enhanced CSI-RS resource configuration operation is to be used. For example, in some implementations, configuration transmission 450 is transmitted to the UE 115. The configuration transmission 450 may include or indicate to use enhanced CSI-RS resource configuration operations or to adjust or implement a setting of a particular type of enhanced CSI-RS resource configuration operation. For example, the configuration transmission 450 may include CSI-RS resource configuration information 406, as indicated in the example of FIG. 4, settings data or any combination thereof.

During operation, devices of wireless communications system 400 perform enhanced CSI-RS resource configuration operations. For example, the network and UEs may exchange transmissions via uplink, downlink, and/or sidelink communications over the communication links and engage in enhanced CSI-RS resource configuration operations as illustrated in the example of FIG. 4. This enhanced CSI-RS resource configuration enables devices to more flexibly perform CSI operations in advanced networking modes and configurations, such as SBFD modes. The enhanced CSI-RS resource configuration may be achieved by modifying (e.g., truncating or puncturing) CSI resources for SBFD modes (e.g., based on downlink subbands thereof). The enhanced CSI-RS resource configuration may provide additionally functionality including extending CSI-RS operations to SBFD modes without requiring separate CSI configurations for SBFD modes or for each slot type. For example, HD CSI-RS resources or FD granularity CSI-RS resources may be configured by a network and the devices of the network may modify the allocated CSI resources on a slot-by-slot basis based on received network configurations or preconfigured settings.

In the example of FIG. 4, the base station 105 transmits a CSI-RS configuration transmission 452 to the UE 115. For example, the base station 105 transmits a RRC message including CSI-RS resource configuration information 406, CSI-RS resource allocation information 408, settings data, or a combination thereof. The CSI-RS configuration transmission 452 may be a DCI transmission, a PDCCH, or a PDSCH, in other examples.

The UE 115 receives the CSI-RS configuration transmission 452 and determines or generates CSI-RS resource allocation information 408 based on the CSI-RS configuration transmission 452. For example, the UE 115 parses the CSI-RS configuration transmission 452 to determine CSI-RS resource configuration information 406 thereof. The UE 115 may parse the CSI-RS resource configuration information 406 to determine the CSI-RS resource allocation information 408. The UE 115 may optionally determine frequency information (e.g., CSI-RS frequency resource information) and/or sequence information based on the CSI-RS resource allocation information 408. Examples of frequency information (e.g., CSI-RS frequency resource information) and/or sequence information are described further with reference to FIGS. 5-11.

The base station 105 may optionally transmit a CSI-RS trigger transmission 454. For example, the base station 105 may transmit a PDCCH transmission to the UE 115 to indicate (e.g., trigger, activate, schedule, or otherwise signal) a particular CSI-RS transmission, such as a CSI-RS transmission 456. The PDCCH transmission may be a downlink control message, such as a DCI transmission, or a MAC CE. For example, the PDCCH transmission may include or correspond to a DCI transmission or a MAC CE which triggers the CSI-RS transmission 456. In a particular implementation a combination of DCI and MAC CE triggers the CSI-RS transmission 456.

The CSI-RS trigger transmission 454 may include an indicator which points to or identifies a particular slot. For example, the indicator may include or correspond to multiple bits which point to a particular entry/location of the selected set of CSI-RS offset values determined by the UE 115. A value of the indicated entry/location of the selected set of CSI-RS offset values determined by the UE 115 corresponds to the indicated offset value for the triggered CSI-RS transmission.

The base station 105 transmits a CSI-RS transmission 456 to the UE 115. For example, the base station 105 may transmit a CSI-RS transmission in the CSI resources or CSI-RS transmission resources determined based on the CSI-RS trigger transmission 454. For example, the UE 115 may determine a slot type of the slot for the CSI-RS transmission 456 indicated by or derived from the CSI-RS trigger transmission 454. The UE 115 may then modify or reduce (e.g., puncture or truncate) the allocated CSI resources for all slots to determine particular CSI resource or CSI-RS transmission resources for the particular slot based on the slot configuration, as further described with reference to FIGS. 6A-9B.

In other implementations, such as CSI-IM or ZP-CSI-RS implementations, the base station 105 does not transmit a CSI-RS transmission 456 to the UE 115. In CSI-IM implementation, the base station 105 may not transmit any transmission in the slot and the UE 115 monitors for interference during the determined CSI resource. In In ZP-CSI-RS implementation, the base station 105 may transmit another transmission (e.g., a data transmission) in the slot in other resources and the UE 115 does not monitor or rate matches around the determined CSI resource.

After determining the particular CSI resource or CSI-RS transmission resources, the UE 115 monitors for the CSI event in the determined CSI-RS resources. In the example of FIG. 4, the UE 115 receives a CSI-RS transmission 456 from the base station 105 in the CSI-RS transmission resources. In other implementations, the UE 115 may monitor for and optionally receive interference, such as measure or estimate CSI-IM during the determined CSI resources. Additionally, in yet other implementations, the UE 115 may determine to not receive a PDSCH or other downlink transmission in the CSI resources (e.g., ZP-CSI-RS resources) and may determine to rate match around such CSI resources (e.g., ZP-CSI-RS resources).

The UE 115 transmits a CSI report 458 based on the CSI-RS transmission 456. For example, the UE 115 receives the CSI-RS transmission 456 and performs one or more measurements on or evaluations of the CSI-RS transmission 456. The UE 115 may determine CSI (e.g., CSI measurements) based on processing the CSI-RS transmission 456. The UE 115 may generate report information based on the CSI and transmit the CSI report 458.

After transmission of the CSI-RS report 458, the base station 105 and UE 115 may perform one or more additional operations based on the CSI-RS report 458. For example, the UE 115 and/or base station 105 may perform additional operations based on the information included in or indicated by the CSI-RS report 458. In the example illustrated in FIG. 4, the UE 115 and base station 105 communicate one or more data transmissions based on the CSI-RS report 458.

In some such implementations, the base station 105, the UE 115, and/or other network devices may perform one or more adjustments or remediations based on the CSI. For example, the UE 115 receives a remediation indication from the network (e.g., the base station 105), which was generated based on the CSI, and may adjust a dynamic grant, a configured grant, a slot format, a BWP, etc., to avoid errors and/or failures. As another example, the UE 115 may adjust a transmission power or beam parameter to avoid errors and/or failures. Additionally, or alternatively, other devices may adjust a configuration or setting to reduce errors and/or failures at the UE 115 based on the CSI.

Additionally, or alternatively, the UE 115 may perform other enhanced CSI-RS resource configuration operations. For example, the UE 115 may perform enhanced CSI-RS resource configuration for ZP-CSI-RS and/or CSI-IM. In such implementations, the UE 115 may not receive a CSI transmission (e.g., CSI-RS transmission 456). For example, the UE 115 may monitor for interference when the CSI or CSI-RS resources correspond to CSI-IM resources or may rate match/block out ZP-CSI-RS resources when the CSI or CSI-RS resources correspond to ZP-CSI-RS resources.

Although the example of FIG. 4 is directed to CSI-RS operations, in other implementations, the devices may additionally or alternatively engage in CSI-IM and/or ZP-CSI-RS operations. Accordingly, the network (e.g., the base station 105, the UE 115, and the second UE 403) may be able to more efficiently and effectively perform CSI operations and enable CSI operations in SBFD modes or slots. Enabling CSI operations in SBFD may increase throughput and reduce latency, without increasing overhead, which may lead to better connections. Accordingly, the network performance and experience may be increased due to the increases in speed and reductions in failure.

Figure 5:
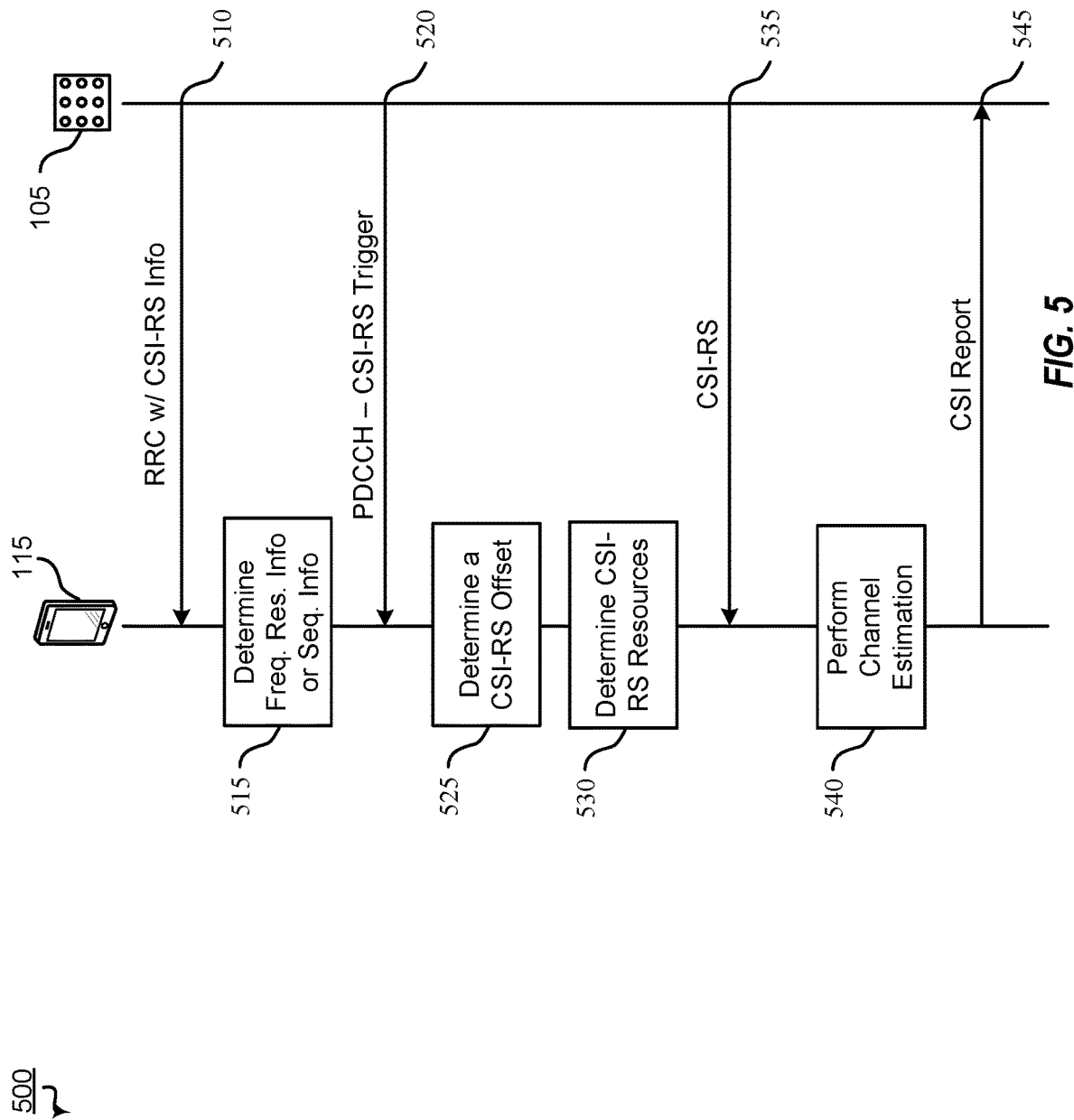
FIG. 5 is a timing diagram illustrating an example process that supports enhanced CSI SBFD operations according to one or more aspects.

Referring to FIG. 5, FIG. 5 is a timing diagram 500 illustrating a wireless communication system that supports enhanced CSI-RS operations according to one or more aspects. The example of FIG. 5 corresponds to an example of enhanced CSI-RS resource allocation operations for SBFD operations. Specifically, the example of FIG. 5 is directed to CSI-RS resource allocation operations for a CSI-RS transmission (e.g., NZP-CSI-RS).

The example of FIG. 5 includes similar devices to the devices described in FIGS. 1, 2, and 4, such as a UE 115 and a network entity (e.g., base station 105). The devices of FIG. 5 may include one or more of the components as described in FIGS. 2 and 4. In FIG. 5, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate and receive transmissions. In some implementations, network entity may include or correspond to multiple TRPs of a single base station (e.g., base station 105), to multiple base stations, or any combination thereof.

At 510, the base station 105 transmits CSI-RS resource information. For example, the base station 105 transmits an RRC transmission including CSI-RS resource configuration information which indicates or includes CSI-RS resource allocation information. As illustrated in the example of FIG. 5, the base station 105 and UE 115 may communicate higher layer signaling, such as RRC signaling (e.g., a RRC transmission or message) or control layer signaling, to transmit the CSI-RS resource allocation information. In other implementations, the base station 105 transmits the CSI-RS resource allocation information in lower layer control signaling, such as MAC CE or DCI in a PDCCH.

At 515, the UE 115 determines the CSI-RS resource allocation information. For example, the UE 115 may receive the CSI-RS resource configuration information and parse the CSI-RS resource configuration information to determine CSI-RS resource allocation information. To illustrate, the UE 115 may determine frequency resource information for CSI-RS resources, sequence information for CSI-RS resources, or both. In some implementations, the CSI-RS resource allocation information may include or correspond to a number of RBs and a starting RB for CSI resources. Additionally, or alternatively, the UE 115 may parse the CSI-RS resource configuration information or allocation information to determine scrambling information (e.g., one or more scrambling IDs) and may generate the sequence information (e.g., one or more sequence IDs) for CSI-RS resources based on the scrambling information. The UE 115 may determine the CSI-RS resource allocation information based on or further based on the sequence information.

As illustrated in the example of FIG. 5, the base station 105 transmits PDCCH CSI-RS trigger transmission, such as DCI. In other implementations, the base station 105 may transmit higher layer signaling, such as RRC signaling (e.g., a RRC transmission or message or MAC CE) or other control layer signaling to activate semi-persistent or periodic CSI-RS resources or to trigger an upcoming aperiodic CSI-RS transmission. To illustrate, in the example of FIG. 5, the base station 105 transmits a trigger transmission to indicate dynamic or aperiodic CSI-RS. In other implementations, the CSI-RS may be periodic or semi-periodic/persistent and activated by MAC CE or RRC.

At 525, after receiving the CSI-RS trigger, the UE 115 may determine a CSI-RS offset (e.g., CSI-RS transmission offset). For example, the UE 115 may determine a timing of a CSI-RS transmission, a CSI monitoring instance, or a CSI rate matching instance indicated by the CSI-RS trigger based on the CSI-RS trigger and the CSI-RS resource configuration information. To illustrate, the CSI-RS resource configuration information may indicate a series of potential offsets for CSI-RS transmissions from the CSI-RS trigger, such as a number of slots from the slot of the CSI-RS trigger, and the UE 115 may determine which particular offset from the potential offsets based on an indicator in the CSI-RS trigger. The UE 115 determines a particular slot for the CSI event indicated by the CSI-RS trigger transmission based on the determined CSI-RS offset (e.g., CSI-RS transmission offset).

At 530, the UE 115 determine CSI-RS resource transmission information. For example, the UE 115 may determine CSI-RS resource transmission information for an upcoming CSI-RS transmission indicated by the CSI-RS trigger transmission based on the CSI-RS resource allocation information and slot information for the determined slot. To illustrate, the UE 115 may determine which resources (e.g., subset of resources, transmission resources) of the allocated resources to use for a particular transmission based on a particular slot configuration of the determined slot (e.g., available downlink resources of the particular slot configuration/subbands). Examples of such determinations are described further with reference to FIGS. 6A-9B.

At 535, the base station 105 transmits a CSI-RS transmission to the UE 115 in the determined slot. For example, the CSI resource manager 439 of the base station 105 determines which resources to use for the CSI-RS transmissions and the base station 105 transmits the CSI-RS transmission to the UE 115 during the resources. To illustrate, the base station 105 may transmit a PDSCH transmission in one or more downlink subbands, where some of the downlink resources include the CSI-RS, and the UE 115 may transmit a PUSCH transmission one or more uplink subbands.

At 540, the UE 115 performs channel estimation based on the CSI-RS transmission. For example, the UE 115 determines one or more metrics/parameter values based on the CSI-RS transmission and for inclusion in a CSI report. As another example, the UE 115 may select a particular reference signal of the CSI-RS transmission based on performance and/or conditions for inclusion in a CSI report At 545, the UE 115 generates and transmits a CSI report based on the CSI-RS transmission. For example, the UE 115 generates a CSI report message including the CSI report and transmits the CSI report message to the base station 105. The CSI report message may include or correspond to a conventional type CSI report message. The CSI report itself may be generated based on a selected reference signal or signals and/or the channel estimation. The CSI report may include or more of transmission parameters, reception parameters, and/or performance metrics. The CSI report format may be set by the base station 105 in the RRC message, another RRC message, the PDCCH transmission, or another PDCCH transmission The offset of the CSI report transmission from the PDCCH transmission may be determined by the UE 115 similar to how the UE 115 determines the offset for the CSI-RS transmission, such as described with reference to FIG. 4. Alternatively, the offset of the CSI report transmission from the PDCCH transmission may be determined by the UE 115 based on conventional methods, such as described with reference to FIG. 3B After the base station 105 receives the CSI report at 540, the base station 105 and the UE 115 may exchange data. For example, the base station 105 and the UE 115 may operate in full-duplex (e.g., SBFD). For example, the base station 105 may transmit downlink data to the UE 115, and/or the UE 115 may transmit uplink data to the base station 105 at the same time (e.g., same slot). Responsive to receiving the downlink data, the UE 115 may transmit an acknowledgment message. For example, the UE 115 may transmit an ACK based on successfully receiving and decoding of the downlink data or a NACK based on unsuccessfully receiving or decoding the downlink data Thus, in the example in FIG. 5, the UE performs conditional usage of a received set of CSI-RS resources based on slot configuration. That is, the UE evaluates which CSI-RS resources to use of the allocated CSI-RS resources based on UE settings and/or operating modes (e.g., slot configuration).

In some implementations, the base station 105 determines remediation information based on receiving the CSI report transmission at 540. For example, the base station 105 may receive and parse the CSI report transmission to determine or identify CSI thereof. The base station 105, such as the CSI manager or remediation manager thereof, may identify one or more network parameters to modify or change. To illustrate, the base station 105 may modify UL/DL settings or operations, sidelink settings or operations, or a combination thereof to help devices of the network (e.g., the UE 115, other UEs, the base station 105, other base stations, etc.)

communicate. The base station 105 may generate remediation information indicative of such actions to reduce improve channel conditions, such as improve channel quality, reduce interference, etc.

The base station 105 may transmit the remediation information to the UE 115. For example, the base station 105 may transmit remediation information indicating a particular configuration change for the UE 115. To illustrate, the base station 105 may transmit DCI, a MAC CE, or RRC signaling to indicate a configuration change for the UE 115. The change may include a configuration adjustment or setting modification, such as a higher layer configuration or parameter, and as described further with reference to FIG. 4. As illustrative, non-limiting examples, the change may include a change in slot settings (e.g., slot format), transmission timing (e.g., configured grant timing, dynamic grant timing, etc.), transmission power, beam information, or a combination thereof.

Additionally, or alternatively, the base station 105 may transmit the remediation information to another device (e.g., second UE or second base station) and/or use the remediation information internally. For example, the base station 105 may transmit the remediation information or second remediation information to a second UE. To illustrate, the base station 105 may transmit the same remediation information to a second UE (e.g., 403) as it did to the UE 115 or it may transmit different remediation information to the second UE. After receiving the remediation information, one or more of the UEs may modify their operation or a transmission or receive parameter to reduce interference.

Optionally, the base station 105 may perform one or more additional operations. For example, the base station 105 may not transmit a remediation indication including remediation information and may instead adjust a configuration or setting of the base station 105. Alternatively, the base station 105 may transmit a remediation indication including remediation information to another base station, such as a base station of another cell or cell group. The other base station may then relay the remediation indication (or the remediation information thereof) or transmit a second remediation indication based on the received remediation indication.

Although the example of FIG. 5 is directed to CSI-RS resource allocation operations for a CSI-RS transmission (e.g., NZP-CSI-RS), in other examples, the enhanced CSI-RS resource allocation operations can be for ZP-CSI-RS or CSI-IM. In CSI-IM examples, the CSI-RS transmission may include or correspond to the UE monitoring for interference during CSI-RS resources. In ZP-CSI-RS examples, there may be no CSI-RS transmission and the UE may receive another transmission where it rate matches around the resources for the ZP-CSI-RS, that is does not monitor for another transmission during the resources for the ZP-CSI-RS.

Figure 6B:
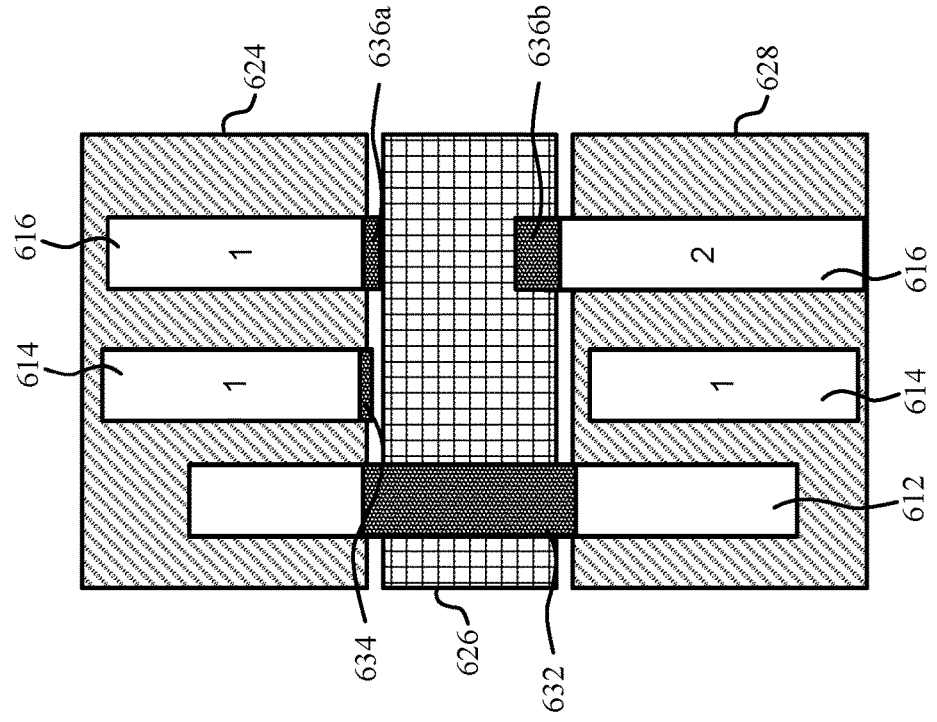
FIGS. 6A and 6B are block diagrams illustrating example CSI resource configurations that support enhanced CSI SBFD operations according to one or more aspects.
Figure 6A:
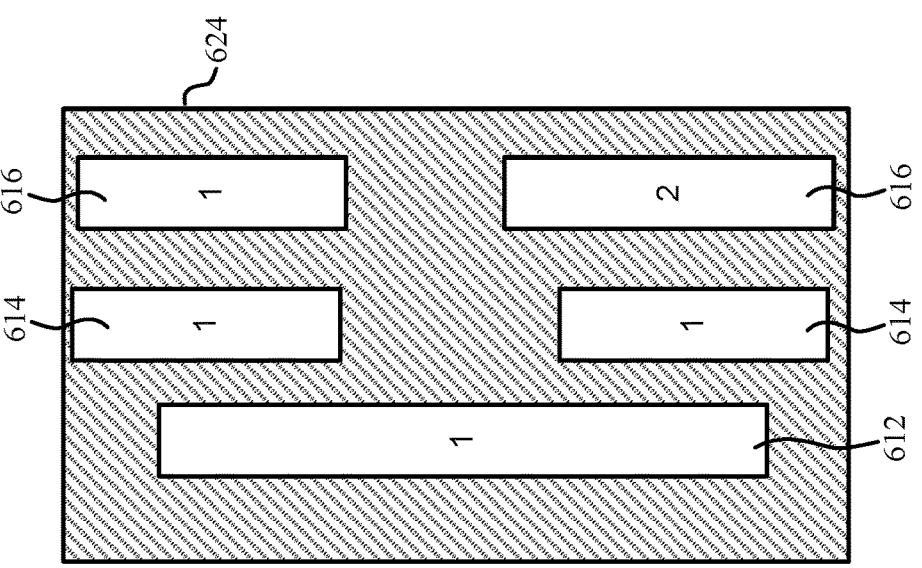

FIGS. 6A and 6B illustrate visual representations of three examples of configured (e.g., active) CSI-RS resources (e.g., FD CSI-RS resources or full transmission bandwidth CSI-RS resources) overlaid on a transmission band of a slot. A slot or transmission band thereof as illustrated in the example of FIG. 6 includes a single band, downlink band 624, and may correspond to a HD slot. Alternatively, the slot may be a FD slot and the transmission band corresponds to a DL subband of the slot (e.g., only the DL portion is shown). The three examples depicted in FIGS. 6A and 6B are a single, contiguous CSI-RS resource 612 (e.g., a single set of contiguous CSI-RS resources), a single, non-contiguous CSI-RS resource 614 (e.g., a single set of CSI-RS resources which are not contiguous or do not have a gap between a CSI-RS resources of the set), two sets of contiguous CSI-RS resources 616 (e.g., a first set of contiguous CSI-RS resources separated from a second set of contiguous CSI-RS resources by a gap). Although the example of FIG. 6A is shown with respect to HD or FD, SBFD slots or operations may include such type of CSI-RS resources.

FIG. 6B illustrates a visual representation of the three examples of configured (e.g., active) CSI-RS resources (e.g., FD CSI-RS resources or full transmission bandwidth CSI-RS resources) overlaid on a transmission band of a SBFD slot. A slot or transmission band thereof as illustrated in the example of FIG. 6 includes two DL subbands 624 and 628, separated by, a single UL subband 626 in the SBFD slot. An active CSI or CSI-RS resource allocations, CSI resources 612-616, are illustrated overlapping portions of the subbands of the SBFD slot.

As compared to the examples shown in FIG. 6A, a portion of the CSI-RS resources in FIG. 6B (e.g., allocated CSI-RS resources or configured CSI-RS resources) are not sent in a particular CSI-RS transmission for a particular SBFD slot, and such are shown in by dark pattern filling. In the example of FIG. 6B, a middle portion 632 is removed (e.g., punctured) from the single, contiguous CSI-RS resource 612, one side portion 634 is removed (e.g., truncated) from one set (e.g., first set) of resources of the single, non-contiguous CSI-RS resource 614, and two side portions 636a and 636b are removed (e.g., truncated) from two or both sets (e.g., first and second sets) of resources of the two sets of contiguous CSI-RS resources 616.

As illustrated in FIGS. 6A and 6B, the CSI-RS resources may be generated based on one or more scrambling and/or sequence IDs. In the examples of FIGS. 6A and 6B, the single, contiguous CSI-RS resource 612 and the single, non-contiguous CSI-RS resource 614 are generated based on a single scrambling ID and sequence ID (1), and the two sets of contiguous CSI-RS resources 616 are generated based on two scrambling IDs and two sequence IDs (2). CSI-RS generation based on scrambling IDs and/or sequence IDs are described further with reference to FIGS. 9A and 9B.

When such types of CSI-RS resources are used with SBFD slots or FD slots, a portion of the CSI-RS resource may be invalid or not useable in some scenarios due to a bandwidth and/or transmission direction limitation, as illustrated and further described with reference to FIGS. 7A-7C. For example, a portion of the CSI-RS resources configured for a particular slot and/or transmission bandwidth may occur during or outside of the DL subbands in SBFD, i.e., occur in one or more UL subbands and/or in optional guardbands between the subbands (e.g., between UL and DL subbands). As such portion of (downlink) CSI-RS resources are not able to be transmitted in uplink portions of a slot dedicated for uplink bandwidth, the devices of the network need to adjust the CSI-RS resources to enable CSI-RS operations in SBFD to account for this. However, there currently exists no framework or support for doing so.

Examples of interpreting CSI-RS resource allocations differently for different slots based on slot configuration information are illustrated in FIGS. 7A-7C. FIGS. 7A-7C each illustrate a transmission band (or band for short) for a particular slot, which represents a channel bandwidth for a duration of a slot. FIGS. 7A-7C further illustrate a visual representation of a configured (e.g., active) CSR-RS (e.g., FD CSI-RS resources or full transmission bandwidth CSI-RS resources) overlaid on the transmission band of the slot. A slot or transmission band as in FIGS. 7A-7C may include one or more subbands, and the BWP may overlap at least a portion of one or more of the subbands thereof. In FIGS. 7A-7C, a device may generate or interpret the same CSI-RS resource allocation differently based on the different slot configurations (e.g., different layouts, placement, sizes, and parameters, such as RBG size, of the slot). As an illustrative example, a CSI-RS resource allocation having 9 RBGs where each RBG has one or more RBs can be interpreted differently for the different slot configurations (e.g., subband configurations) of FIGS. 7A-7C. As described herein, the slot configuration corresponds to a location and size of subbands in a slot, and optionally, a corresponding RBG size.

Referring to FIG. 7A, a band 700 having a first slot configuration is illustrated. The first slot configuration may be referred to as DL or DL only configuration. The first slot configuration has a single DL band 722 which spans the length of the band 700/slot. An active CSI or CSI-RS resource allocation, CSI resources 712, is illustrated overlapping a portion of the band 700.

In the example of FIG. 7A, the band 700 includes single DL band 722 which spans the length of the band 700/slot, and an entirety of the CSI resources 712 overlap with the single DL subband 724. Thus, the CSI-RS resources of the CSI-RS transmission correspond to the CSI-RS resources of the CSI resources 712 (i.e., no resources are removed).

Referring to FIG. 7B, a band 710 having a second slot configuration is illustrated. The second slot configuration may be referred to as mixed configuration or SBFD. The second slot configuration has a single DL subband 724 and a single UL subband 726 in the band 710/slot. An active CSI or CSI-RS resource allocation, CSI resources 712, is illustrated overlapping a portion of each subband of band 710. Similar to FIG. 7A, the CSI resources 712 may include other types of CSI-RS resources (e.g., 614 or 616) in other implementations.

In the example of FIG. 7B, a portion of the CSI resources 712 do not overlap with the single DL subband 724. Rather, a portion of the CSI resources 712 overlap with the single UL subband 726. Thus, for the slot configuration of FIG. 7B, the device may determine that the effective resources of the resource allocation are the resources which correspond to the portion of the CSI resources 712 that overlaps the DL subband 724. In the example, of FIG. 7B, the effective length of the resource allocation is less than the effective length of the resource allocation of FIG. 7A.

Referring to FIG. 7C, a band 720 having a third slot configuration is illustrated. The third slot configuration may be referred to as mixed configuration or SBFD. The third slot configuration has two DL subbands 724 and 728, separated by, a single UL subband 726 in the band 720/slot. An active CSI or CSI-RS resource allocation, CSI resources 712, is illustrated overlapping a portion of each subband of band 720. Similar to FIGS. 7A and 7B, the CSI resources 712 may include other types of CSI-RS resources (e.g., 614 or 616) in other implementations.

In the example of FIG. 7C, a portion of the CSI resources 712 overlaps portions of both DL subbands 724 and 728. Thus, for the CSI resources 712, the device may determine that the effective length of the resource allocation corresponds to the portion of the DL BWP that overlaps the DL subbands 724 and 728. In the example, of FIG. 7C, the effective length of the resource allocation is less than the effective length of the resource allocation of FIG. 7A and greater than the effective length of the resource allocation of FIG. 7B.

Although the examples of FIGS. 7A-7C illustrate CSI-RS resources which fully overlap (e.g., are aligned with) the DL subbands. In other implementations, the CSI-RS resources may not be aligned with and/or fully overlap but may partially overlap the DL subbands. To illustrate, RB or RBGs of the CSI-RS may fully or partially overlap the UL subbands, DL subbands, and/or guardbands In some implementations, a granularity of the CSI-RS resources may be different from a granularity (e.g., 1) of the subbands of the band/slot. To illustrate, the CSI-RS may be defined int terms of RBGs, and a granularity of the CSI-RS may be 4 RBs per RBG. In such implementations, the devices of the network may be configured to remove all RBs of a partially overlapping RBG or may remove only a portion of the RBs of a partially overlapping RBG.

Figures 8A, 8B:
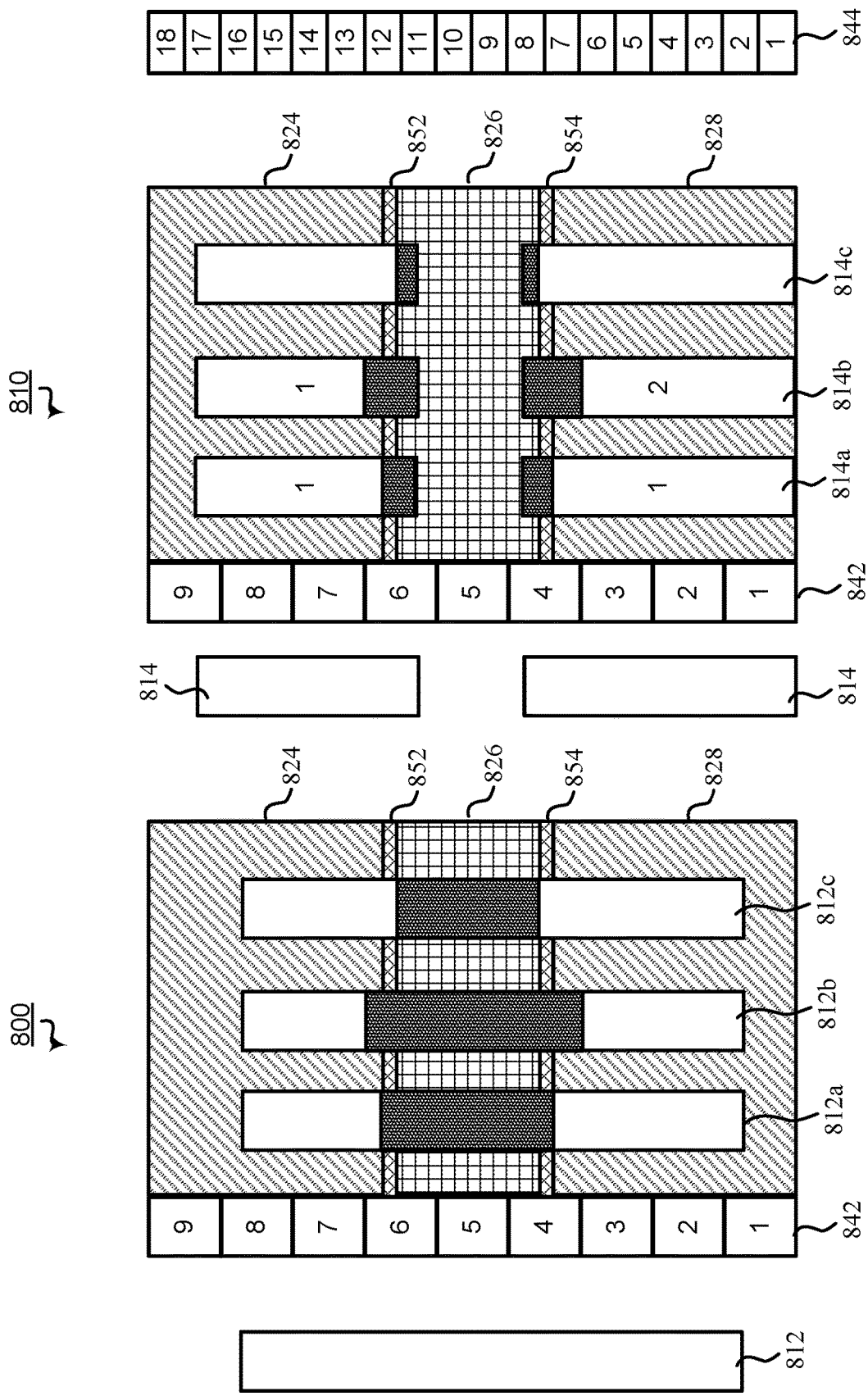
FIGS. 8A and 8B are block diagrams illustrating example CSI resource configurations that support enhanced CSI SBFD operations according to one or more aspects.

Thus, as illustrated in FIGS. 7A-7C the same resource allocation information (e.g., frequency resource information and/or sequence information) of the CSI resources 712 may be interpreted differently based on the slot configuration (e.g., the subbands of the band (700, 710, or 720)), and/or network parameters/conditions (e.g., RBG size as described further with reference to FIGS. 8A and 8B).

In the examples of FIGS. 7A-7C, each block of the CSI resources 712 corresponds to a RBG group which fully overlaps (i.e., does not partially overlap) a bandwidth of the DL band or subband. In other examples, such as shown in FIGS. 8A-8B, one or more RBs of the RBG groups of the CSI resources 712 may only partially overlap a bandwidth of the DL band or subband. That is, the RBG may overlap both the bandwidth of the DL band or subband and overlaps either a bandwidth of a guardband or a bandwidth of an UL band or subband.

Examples of interpreting CSI-RS resource allocations differently for different slots based on slot configuration information are illustrated in FIGS. 8A and 8B. FIGS. 8A and 8B each illustrate a transmission band (or band for short) for a particular slot, which represents a channel bandwidth for a duration of a slot and further illustrate a visual representation of a configured (e.g., active) CSR-RS resource overlaid on the transmission band of the slot, similar to FIGS. 7A-7C.

Referring to FIG. 8A, a band 800 having a fourth slot configuration is illustrated. The fourth slot configuration, like the third slot configuration, may be referred to as mixed configuration or SBFD. The fourth slot configuration has two DL subbands 824 and 828, separated by, a single UL subband 826 in the band 800/slot. The fourth slot configuration also includes guardbands 852 and 854.

The guardbands 852 and 854 are illustrated in between the DL subbands 824 and 828 and the UL subband 826. Although not illustrated in the other figures (e.g., FIGS. 6A-7C) for simplicity, guardbands (e.g., guardbands 852 and 854) may be used in any of the other implementations between two subbands and/or between channels or bands. When transmitting the overlapping portion of RBs, the device may not transmit RBs which fully or partially overlap a guardband, depending on network configuration.

An active CSI or CSI-RS resource allocation, CSI resources 812, is illustrated next to band 800. Specific, e.g., slot or transmission specific CSI or CSI-RS transmission resources, CSI resources 812a-812c, are illustrated overlapping a portion of each subband of band 800.

As shown in the example of FIG. 8A, three different transmission configurations of CSI resources 812a-812c may be generated based on the active CSI or CSI-RS resource allocation, CSI resources 812 depending on network configurations. For example, the network (e.g., base station 105) may indicate how to handle partial overlaps, full overlaps, RB or RBG alignment/granularity, etc., to handle CSI RBG overlaps. RBG diagram 842 illustrates RBGs of the CSI resources 812 allocation or band 800, i.e., RBGs 1-9. Each RBG of the RBG diagram 842 may include one or more RBs.

In some implementations, the network may configure the UE 115 to have a granularity of one or which matches a granularity of the band 800. To illustrate, the UE 115 may determine to only puncture the overlapping RBs of RBGs of the CSI resources 812 which overlap the UL subbands and/or guardbands to generate the CSI transmission resources 812a.

In other implementations, the network may configure the UE 115 to have a granularity of greater than 1 or greater than a granularity of the band 800. To illustrate, the UE 115 may determine to puncture all RBs (including non-overlapping RBs) of RBGs of the CSI resources 812 which overlap the UL subbands and/or guardbands to generate the CSI transmission resources 812b. As compared to the CSI transmission resources 812a, the CSI transmission resources 812b have additional RBs removed from the allocated CSI resources 812 and the additional RBs removed correspond to non-overlapping RBs of the RBG 4 and RBG 6. Specifically, RBs of the RBG 4 and RBG 6 which occur or overlap in the DL subbands are still removed or punctured based on other adjacent RBs or RBs of their RBG which overlap (i.e., some RBs of RBG 4 and RBG 6 also overlap UL subbands and/or guardbands).

Alternatively, the network may permit guardband transmission of CSI resource in particular implementations, as shown by the CSI transmission resources 812c. In such implementations, the network may configure the UE 115 to use partial or full overlap for RB determination. The example of the CSI transmission resources 812c has partial overlap enabled, i.e., the CSI transmission resources 812c includes resources for RBs which occur in DL subbands even when the RBs are part of RBGs (e.g., RBG 4 and RBG 6) that partially overlap non-DL subbands. The examples of FIG. 8A are illustrated with respect to CSI-RS resources that include or correspond to a single, contiguous CSI-RS resource 612 (e.g., a single set of contiguous CSI-RS resources). In other implementations, such as illustrated in FIG. 8B, the CSI-RS resources include or correspond to a single, non-contiguous CSI-RS resource 614 (e.g., a single set of CSI-RS resources which are not contiguous or do not have a gap between a CSI-RS resources of the set) or to two sets of contiguous CSI-RS resources 616 (e.g., a first set of contiguous CSI-RS resources separated from a second set of contiguous CSI-RS resources by a gap).

Referring to FIG. 8B, a band 810 having a fifth slot configuration is illustrated. The fifth slot configuration, like the third and/or fourth slot configuration, may be referred to as mixed configuration or SBFD. The fifth slot configuration has two DL subbands 824 and 828, separated by, a single UL subband 826 in the band 800/slot. The fifth slot configuration also includes guardbands 852 and 854. The guardbands 852 and 854 are illustrated in between the DL subbands 824 and 828 and the UL subband 826.

An active CSI or CSI-RS resource allocation, CSI resources 814, is illustrated next to band 810. Slot or transmission specific CSI or CSI-RS transmission resources, CSI resources 814a-814c, are illustrated overlapping a portion of each subband of band 810.

As shown in the example of FIG. 8B, three different transmission configurations of CSI resources 814a-814c for the particular slot may be generated based on the active CSI or CSI-RS resource allocation, CSI resources 814, for all slots depending on network configurations. For example, the network (e.g., base station 105) may indicate how to handle partial overlaps, full overlaps, alignment/granularity, etc., to handle CSI RBG overlaps. RBG diagram 842 illustrates RBGs of the CSI resources 814 allocation or band 810, i.e., RBGs 1-9. Each RBG of the RBG diagram 842 may include one or more RBs. Alternatively, the network may configure a second RBG diagram 844 which illustrates RBGs of the CSI resources 814 allocated or band 810, i.e., RBGs 1-18. In some implementations, each RBG may only include 1 RB.

Additionally, or alternatively, the network may configure the UE 115 to have a granularity of 1 (e.g., use the second RBG diagram 844) for the CSI-RS resources or to have a granularity which matches a granularity of the band 810. To illustrate, in such implementations there may be no partial RB or RBG overlaps, and the UE 115 may determine to only truncate the overlapping RBs/RBGs of the CSI resources 814 which fully overlap the UL subbands and/or guardbands to generate the CSI transmission resources 814a.

In other implementations, the network may configure the UE 115 to have a granularity of greater than 1 or greater than a granularity of the band 800. To illustrate, in such implementations there may be some partial RB or RBG overlaps, and the UE 115 may determine to truncate all RBs (including non-overlapping RBs) of RBGs of the CSI resources 814 which overlap (including partial overlaps) the UL subbands and/or guardbands to generate the CSI transmission resources 814b. As compared to the CSI transmission resources 814a, the CSI transmission resources 814b have additional RBs removed (truncated) from the allocated CSI resources 814 and the additional RBs removed correspond to non-overlapping RBs of the RBG 4 and RBG 6. Specifically, all RBs of the RBG 4 and RBG 6, even those which occur or overlap in the DL subbands are still removed or truncated based on other adjacent RBs or RBs of their RBG which overlap (i.e., some RBs of RBG 4 and RBG 6 also overlap UL subbands and/or guardbands) in the example shown in FIG. 8B for CSI transmission resources 814b.

Alternatively, the network may permit guardband transmission of CSI resource in particular implementations, as shown by the CSI transmission resources 814c. In such implementations, the network may configure the UE 115 to use partial or full overlap for RB determination. The example of the CSI transmission resources 814c has partial overlap enabled, i.e., the CSI transmission resources 814c includes resources for RBs which occur in DL subbands even when the RBs are part of RBGs (e.g., RBG 4 and RBG 6) that partially overlap non-DL subbands.

The examples of FIG. 8B are illustrated with respect to CSI-RS resources that include or correspond to a single, non-contiguous CSI-RS resource 614 (e.g., a single set of CSI-RS resources which are not contiguous or do not have a gap between a CSI-RS resources of the set) or to two sets of contiguous CSI-RS resources 616 (e.g., a first set of contiguous CSI-RS resources separated from a second set of contiguous CSI-RS resources by a gap). In other implementations, such as illustrated in FIG. 8A, the CSI-RS resources include or correspond to a single, contiguous CSI-RS resource 612 (e.g., a single set of contiguous CSI-RS resources).

Figures 9A, 9B:
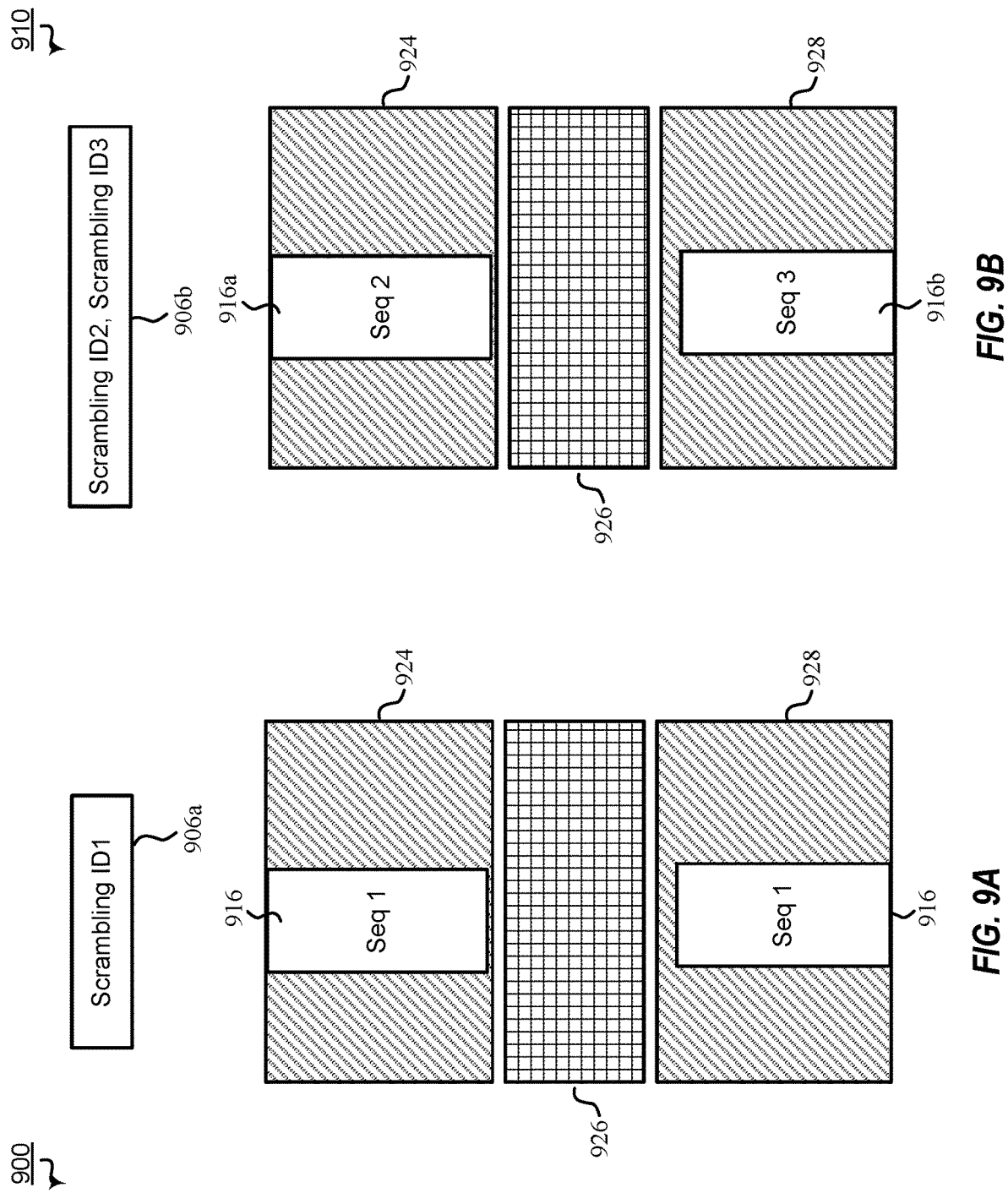
FIGS. 9A and 9B are block diagrams illustrating example CSI resource configurations that support enhanced CSI SBFD operations according to one or more aspects.

FIGS. 9A and 9B are block diagrams each illustrating an example of sequence ID generation that supports enhanced CSI-RS resource configurations according to one or more aspects. Referring to FIG. 9A, FIG. 9B is a block diagram 900 illustrating a first example of sequence ID generation. In the example of FIG. 9A, CSI-RS resources 916 include or correspond to a single, non-contiguous CSI-RS resource 614 (e.g., a single set of CSI-RS resources which are not contiguous or do not have a gap between a CSI-RS resources of the set) or to two sets of contiguous CSI-RS resources 616 (e.g., a first set of contiguous CSI-RS resources separated from a second set of contiguous CSI-RS resources by a gap). Alternatively, the CSI-RS resources 916 may include or correspond single, contiguous CSI-RS resource 612 (e.g., a single set of contiguous CSI-RS resources).

As illustrated in the example of FIG. 9A, the CSI-RS resources 916 have or are generated based on a single sequence, sequence 1. The sequence may be identified or indicated by a sequence identifier (sequence ID). The sequence (sequence 1) may be generated based on one or more scrambling identifiers (scrambling IDs). For example, the sequence (sequence 1) may be generated based on a single scrambling ID, such a scrambling ID1 906a. Scrambling ID1 906 may be included in CSI-RS resource configuration information 406. Alternatively, sequence (sequence 1) may be generated based on multiple scrambling IDs, such as a scrambling ID2 906b and scrambling ID3 906c.

Referring to FIG. 9B, FIG. 9B is a block diagram 910 illustrating a second example of sequence ID generation. In the example of FIG. 9B, CSI-RS resources 916a and 916b include or correspond to a single, non-contiguous CSI-RS resource 614 (e.g., a single set of CSI-RS resources which are not contiguous or do not have a gap between a CSI-RS resources of the set) or to two sets of contiguous CSI-RS resources 616 (e.g., a first set of contiguous CSI-RS resources separated from a second set of contiguous CSI-RS resources by a gap). Alternatively, the CSI-RS resources 916a and 916b may include or correspond single, contiguous CSI-RS resource 612 (e.g., a single set of contiguous CSI-RS resources).

As illustrated in the example of FIG. 9B, the CSI-RS resources 916a and 916b have or are generated based on multiple sequences, such as sequence 2 and sequence 3. The sequences may be identified or indicated by a sequence identifier (sequence ID). Each sequence may be generated based on one or more scrambling identifiers (scrambling IDs) or both sequences may be generated based on one or more scrambling identifiers (scrambling IDs). For example, the first sequence (sequence 2) may be generated based on a first scrambling ID, such a scrambling ID2 906b, and the second sequence (sequence 3) may be generated based on a second scrambling ID, such a scrambling ID3 906c. Alternatively, the first sequence (sequence 2) and the second sequence (sequence 3) may be generated based on the same scrambling ID, such as a scrambling ID1 906a.

In the examples illustrated in FIGS. 9A and 9B, the sequence IDs and/or scrambling IDs may correspond to sets of CSI resources in a particular DL subband when multiple sequence IDs and/or scrambling IDs are used. To illustrate, a first DL subband corresponds to a first sequence ID and a second DL subband corresponds to a second sequence IDs when multiple sequence IDs are used. In a particular implementation, each DL subband includes CSI-RS resource for a set of resources of the two sets of contiguous CSI-RS resources 616. In such implementations, each sequence ID and/or scrambling ID may correspond to the CSI-RS resources for a particular set of resources of the two sets of contiguous CSI-RS resources 616.

In the aspects described herein, CSI-RS modification and removal operations and enhancements are disclosed to enable removal (e.g., by truncation or puncturing) of CSI-RS resources which are scheduled outside of the DL subbands.

Additionally, in some implementations CSI-RS resources are allocated in blocks or groups, such as REG or RBG. A granularity of the groups of resource blocks, e.g., a resource block group size or threshold, for CSI-RS resources may be larger (e.g., 4 RB in an RBG) and a granularity of the resources for the bands themselves (e.g., may be 1 RB). Thus, additional enhancements are needed to accommodate for this mismatch in granularity and different overlap situations. For example, when CSI-RS resources are allocated in groups that are larger than those of the DL subband, CSI-RS resources or a particular group may overlap the GB and/or UL subband completely (e.g., completely outside of the DL subband) or may partially overlap the GB and/or UL subband (e.g., some resources of the CSI-RS resources of the group overlap the GB/or UL subband and/or UL subband are within the DL subband).

In the aspects described herein, one or more granularity thresholds or granularity conditions may be defined for SBFD operations. For example, a granularity threshold or condition may be defined on a per DL subband basis or as a total for all DL subbands. To illustrate, a minimum bandwidth configuration or a minimum group size or resource resolution size after removal of the invalid CSI-RS resources (e.g., after truncation or puncturing) may be used.

When the CSI-RS resources corresponds to two sets of contiguous CSI-RS resources, each set of contiguous CSI-RS resources may have its own sequence ID (e.g., first and second sequence IDs). Each sequence ID may be generated based on or determined from a corresponding scrambling ID (e.g., first and second scrambling IDs). Alternatively, the other types of CSI-RS resources (e.g., single contiguous and single non-contiguous) may be generated based on multiple sequence or scrambling IDs. As illustrative, non-limiting example, the single contiguous CSI-RS resource may be made up of two portions, portion with its own corresponding scrambling and/or sequence ID. As another illustrative, non-limiting example, the single non-contiguous CSI-RS resource may be made up of two portions (e.g., the gap may define the two contiguous portions), each portion with its own corresponding scrambling and/or sequence ID. Generation of CSI resources based on a scrambling ID and/or sequence ID may correspond to generation of CSI resources for NZP-CSI-RS transmission. Sequence and/or scrambling information may not be used to determine CSI resources for CSI operations which do not involve reference signal transmissions, such as CSI-IM and ZP-CSI-RS. In such CSI-IM or ZP-CSI-RS implementations, the corresponding CSI resources may not be determined based on sequence information as there is no transmission, such as no reference signal transmission, and such resources may be determined based on the frequency resource information as describe with reference to previous figures.

Additionally, or alternatively, one or more operations of FIGS. 3A, 3B, 4, 4, 6A, 6B, 7A-7C, 8A, 8B, 9A, and 9B may be added, removed, substituted in other implementations. For example, in some implementations, a UE may determine CSI-RS resources by puncturing resources as in the examples of FIG. 8A or truncating resources as in the examples of FIG. 8B, and may determine the CSI-RS resources based on one or more sequence IDs as in FIG. 9A or 9B.

Figures 10, 11:
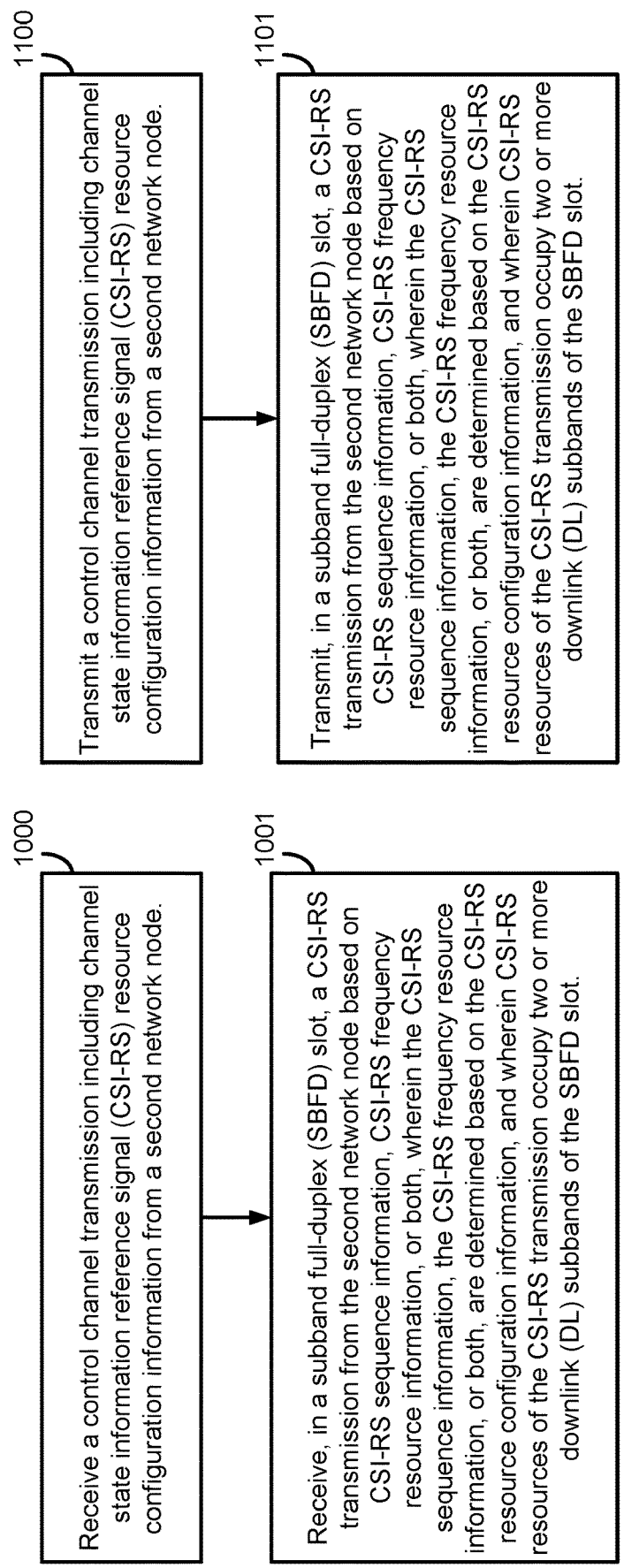
FIG. 10 is a flow diagram illustrating an example process that supports enhanced CSI SBFD operations according to one or more aspects.
FIG. 11 is a flow diagram illustrating an example process that supports enhanced CSI SBFD operations according to one or more aspects.
Figure 12:
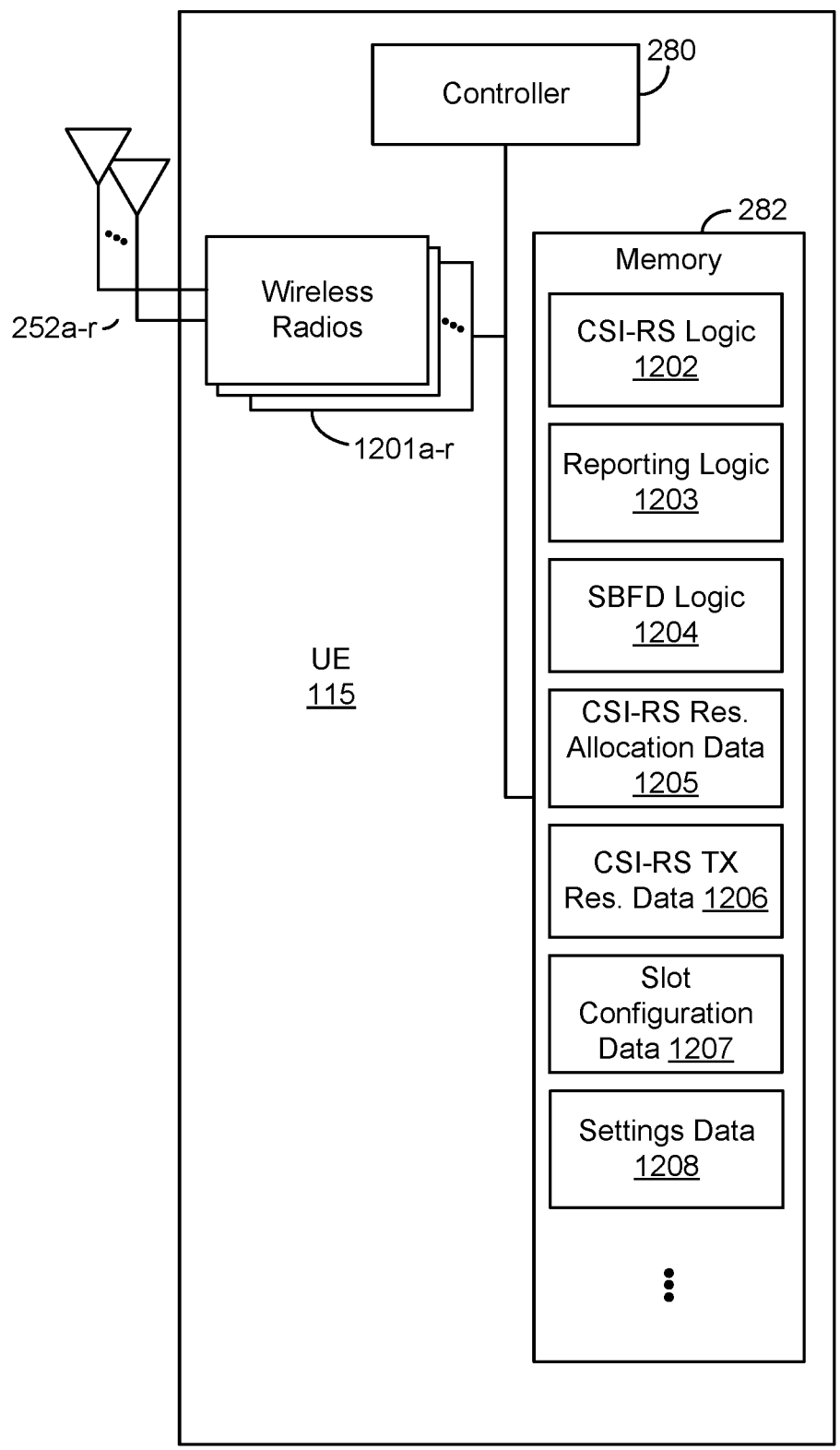
FIG. 12 is a block diagram of an example UE that supports enhanced CSI SBFD operations according to one or more aspects.

FIG. 10 is a flow diagram illustrating example blocks executed by a UE configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 12, memory 282 stores CSI-RS logic 1202, reporting logic 1203, SBFD logic 1204, CSI-RS resource allocation data 1205, CSI-RS transmission resource data 1206, slot configuration data 1207, and settings data 1208.

At block 1000, a wireless communication device, such as a UE, receives control channel transmission including CSI-RS resource configuration information from a second network node. For example, the UE 115 receives the control channel transmission 452 including the CSI-RS resource configuration information 406 of FIG. 4, as described with reference to FIG. 4. To illustrate, the UE 115 may receive a RRC transmission including a CSI-RS configuration information element which allocates CSI frequency resources for multiple CSI types, as described with reference to FIG. 4. Alternatively, the information may be in DCI or MAC CE or in multiple transmissions. The CSI-RS resource configuration information may include or correspond to the CSI-RS resource configuration information 406 of FIG. 4 or one of the CSI or CSI-RS resource allocations of FIGS. 6A-9. The second network node may include or correspond to a base station, such as base station 105.

At block 1001, the UE 115 receives, in a SBFD slot, a CSI-RS transmission from the second network node based on CSI-RS sequence information, CSI-RS frequency resource information, or both. The CSI-RS sequence information, the CSI-RS frequency resource information, or both, are determined based on the CSI-RS resource configuration information, and CSI-RS resources of the CSI-RS transmission occupy two or more downlink subbands of the SBFD slot. For example, the UE 115 receives a CSI-RS transmission 456 from the base station 105 based on CSI-RS sequence information, CSI-RS frequency resource information, or both. To illustrate, the UE 115 determines the CSI-RS sequence information, the CSI-RS frequency resource information, or both, based on the CSI-RS resource configuration information 406 included in the control channel transmission 452, and determines specific CSI-RS transmission resources or CSI resources (e.g., 812a-812c, 814a-814c) for a particular slot based on the CSI-RS sequence information, the CSI-RS frequency resource information, and the slot information (e.g., slot configuration), as described with reference to FIGS. 4-9.

The CSI-RS sequence information may include or correspond to the scrambling ID and/or sequence ID information described with reference to FIGS. 4, 6A 6B, and 9. The CSI-RS frequency resource information may include or correspond to the CSI-RS resource allocation information 408 and/or the CSI-RS transmission resource information 442 (e.g., CSI-RS transmission resource information) and may be determined based on the CSI-RS resource configuration information 406 of FIG. 8 or one of the CSI or CSI-RS resource allocations of FIGS. 6A-9. As an illustrative example, the CSI-RS frequency resource information may include or correspond to a number of RBs and a starting RB, a granularity for RBs of RBGs for CSI-RS resources, a condition for dealing with partial or full overlaps, a condition of whether CSI-RS resources can overlap a guardband, etc., and may enable determination of a subset of resources for a CSI transmission or event in a particular slot (e.g., SBFD slots) of allocated CSI-RS resources for all slots or all slots of a particular type (e.g., HD slots or FD slots, or a FD CSI resource configuration), or a combination thereof.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, the CSI-RS resources of the CSI transmission correspond to a single contiguous set of CSI-RS resources occupying the two or more DL subbands.

In a second aspect, alone or in combination with one or more of the above aspects, the CSI-RS resources of the CSI transmission correspond to a single non-contiguous set of CSI-RS resources occupying the two or more DL subbands.

In a third aspect, alone or in combination with one or more of the above aspects, the CSI-RS resources of the CSI transmission correspond to two separate and contiguous sets of CSI-RS resource, each set of CSI-RS resources occupying a corresponding DL subband of the two or more DL subbands.

In a fourth aspect, alone or in combination with one or more of the above aspects, the CSI-RS frequency resource information comprises resource block granularity information for CSI-RS resources in SBFD, resource block information for CSI-RS transmissions, or both.

In a fifth aspect, alone or in combination with one or more of the above aspects, the CSI-RS sequence information comprises a sequence identifier and is determined based on one or more scrambling identifiers indicated by the CSI-RS resource configuration information.

In a sixth aspect, alone or in combination with one or more of the above aspects, the at least one processor is configured to: receive a second control channel transmission including a CSI-RS trigger indication for the CSI-RS transmission; and determine the SBFD slot for the CSI-RS transmission based on a slot of the second control channel transmission and offset information of the CSI-RS resource configuration information.

In a seventh aspect, alone or in combination with one or more of the above aspects, the CSI-RS resource configuration information indicates a number of CSI-RS resource blocks for CSI-RS transmissions and a starting resource block for the CSI-RS transmissions.

In an eighth aspect, alone or in combination with one or more of the above aspects, the at least one processor is configured to: determine the CSI-RS sequence information, CSI-RS frequency resource information, or both, based on the CSI-RS resource configuration information; determine a location of the CSI-RS resources of the CSI-RS transmission in the DL subbands based on the CSI-RS sequence information, CSI-RS frequency resource information, or both; measure the CSI-RS resources of the CSI-RS transmission from the second network node; and transmit a CSI report based on the measured CSI-RS resources.

In a ninth aspect, alone or in combination with one or more of the above aspects, the CSI-RS comprises a non-zero power CSI-RS (NZP-CSI-RS).

In a tenth aspect, alone or in combination with one or more of the above aspects, a slot configuration of the SBFD slot has two downlink subbands separated by an uplink subband.

In an eleventh aspect, alone or in combination with one or more of the above aspects, the CSI-RS resource configuration information indicates frequency resources allocated for CSI-RS transmissions, wherein the CSI-RS resources of the CSI-RS transmission correspond to a subset of frequency resources of the frequency resources allocated for CSI-RS transmissions.

In a twelfth aspect, alone or in combination with one or more of the above aspects, the at least one processor is configured to: receive slot type information; and interpret CSI-RS resource allocation information of the CSI-RS resource configuration information based on the slot type information to determine the CSI-RS resources of the CSI-RS transmission.

In a thirteenth aspect, alone or in combination with one or more of the above aspects, to interpret the CSI-RS resource allocation information includes to: determine a set of CSI-RS resources allocated for full-duplex operation as allocated CSI-RS resources based on the CSI-RS resource allocation information; determine CSI-RS resources of the allocated CSI-RS resources which overlap any UL subband and optionally any guardband between the UL subband and the two or more downlink subbands based on the slot type information; and puncture the determined CSI-RS resources which overlap the UL subband and optionally the guardbands from the allocated CSI-RS resources to determine the CSI-RS resources of the CSI-RS transmission and which occur in the two or more DL subbands, wherein the first network node monitors the CSI-RS resources of the CSI-RS transmission and does not monitor the determined CSI-RS resources of the allocated CSI-RS resources.

In a fourteenth aspect, alone or in combination with one or more of the above aspects, to puncture the determined CSI-RS resources from the allocated CSI-RS resources to determine the CSI-RS resources of the CSI-RS transmission includes to puncture independent of CSI-RS resource block granularity information.

In a fifteenth aspect, alone or in combination with one or more of the above aspects, to puncture the determined CSI-RS resources from the allocated CSI-RS resources to determine the CSI-RS resources of the CSI-RS transmission includes to puncture further based on CSI-RS resource block granularity information, and wherein each set of resource blocks of the allocated CSI-RS resources which only partially overlap a downlink subband of the two or more downlink subband are punctured.

In a sixteenth aspect, alone or in combination with one or more of the above aspects, the CSI-RS resources are non-contiguous, and to interpret the CSI-RS resource allocation information includes to: determine a set of CSI-RS resources allocated for full-duplex operation as allocated CSI-RS resources based on the CSI-RS resource allocation information; determine whether any CSI-RS resources of the allocated CSI-RS resources overlap any UL subband and optionally any guardband between the UL subband and the two or more downlink subbands based on the slot type information; and determine the allocated CSI-RS resources as the CSI-RS resources of the CSI-RS transmission based on determining that no CSI-RS resources of the allocated CSI-RS resources overlap, wherein the first network node monitors the allocated CSI-RS resources.

In a seventeenth aspect, alone or in combination with one or more of the above aspects, the CSI-RS resources are non-contiguous, and wherein to interpret the CSI-RS resource allocation information includes to: determine a set of CSI-RS resources allocated for full-duplex operation as allocated CSI-RS resources based on the CSI-RS resource allocation information; determine CSI-RS resources of the allocated CSI-RS resources which overlap any UL subband and optionally any guardband between the UL subband and the two or more downlink subbands based on the slot type information; and truncate the determined CSI-RS resources which overlap the UL subband and optionally the guardbands from the allocated CSI-RS resources to determine the CSI-RS resources of the CSI-RS transmission and which occur in the two or more DL subbands, wherein the first network node monitors the CSI-RS resources of the CSI-RS transmission and does not monitor the determined CSI-RS resources of the allocated CSI-RS resources.

In an eighteenth aspect, alone or in combination with one or more of the above aspects, to truncate the determined CSI-RS resources from the allocated CSI-RS resources to determine the CSI-RS resources of the CSI-RS transmission includes to truncate further based on CSI-RS resource block granularity information, and wherein the CSI-RS resource block granularity information indicates a granularity of a single resource block.

In a nineteenth aspect, alone or in combination with one or more of the above aspects, the CSI-RS resource configuration information comprises a minimum CSI-RS bandwidth configuration for SBFD.

In a twentieth aspect, alone or in combination with one or more of the above aspects, the minimum CSI-RS bandwidth configuration for SBFD is a minimum configuration of resource blocks per DL subband after truncation or puncturing for any UL subbands, guardbands, or both.

In a twenty-first aspect, alone or in combination with one or more of the above aspects, the minimum CSI-RS bandwidth configuration for SBFD is a minimum configuration of resource blocks for all DL subbands after truncation or puncturing for any UL subbands, guardbands, or both.

In a twenty-second aspect, alone or in combination with one or more of the above aspects, the CSI-RS resources are determined based on one sequence ID.

In a twenty-third aspect, alone or in combination with one or more of the above aspects, the CSI-RS resources are determined based on two sequence IDs.

In a twenty-fourth aspect, alone or in combination with one or more of the above aspects, the CSI-RS resource configuration information indicates a single scrambling ID, and the at least one processor is configured to: determine a sequence ID based on a single scrambling ID; determine that the CSI-RS resources of the CSI-RS transmission are in a first DL subband and a second DL subband of the two or more DL subbands based on the sequence ID.

In a twenty-fifth aspect, alone or in combination with one or more of the above aspects, to determine the CSI-RS resources in the first DL subband and the second DL subband based on the sequence ID includes to: determine the CSI-RS resources in an uplink band, one or more guardbands, or a combination thereof, based on the sequence ID; and puncture or truncate the determined CSI-RS resources in the UL and GB bands to determine the CSI-RS resources in the first DL subband and the second DL subband, wherein the CSI-RS resources in the first DL subband and the second DL subband correspond to the CSI-RS resources of the CSI-RS transmission.

In a twenty-sixth aspect, alone or in combination with one or more of the above aspects, the CSI-RS resource configuration information indicates two scrambling IDs, and wherein the at least one processor is configured to: determine a first sequence ID based on a first scrambling ID; determine a second sequence ID based on the second scrambling ID; determine the CSI-RS resources in a first DL subband of the two or more DL subbands based on the first sequence ID; and determine the CSI-RS resources in a second DL subband of the two or more DL subbands based on the second sequence ID.

In a twenty-seventh aspect, alone or in combination with one or more of the above aspects, a CSI-RS resource block granularity is 4 RBs (e.g., in full-duplex (FD) and half-duplex (HD) modes), and a DL subband resource block granularity is 1 RB.

In a twenty-eighth aspect, alone or in combination with one or more of the above aspects, a CSI-RS resource block granularity is 1 RB, and a DL subband resource block granularity is 1 RB.

In a twenty-ninth aspect, alone or in combination with one or more of the above aspects, the CSI-RS resource configuration information includes configuration information for all CSI types (e.g., ZP, NZP, CSI-IM, etc.). In some such implementations, the configurations for all three CSI types are the same. In some other implementations, the configuration for one or more CSI types are different. For example, all three CSI types may allow RBs in DL only, and one CSI type (e.g., CSI-IM) may also allow RBs (e.g., monitoring for interference for CSI-IM) in guardbands as well as DL subbands.

In an additional aspect of the disclosure, an apparatus includes at least one processor and a memory coupled to the at least one processor. The at least one processor is configured to: receive a control channel transmission including channel state information reference signal (CSI-RS) resource configuration information from a second network node; and monitor, in a subband full-duplex (SBFD) slot, for interference in CSI-IM resources based on CSI-RS frequency resource information, wherein the CSI-RS frequency resource information is determined based on the CSI-RS resource configuration information, and wherein the CSI-IM resources occupy two or more downlink (DL) subbands of the SBFD slot.

In an additional aspect of the disclosure, an apparatus includes at least one processor and a memory coupled to the at least one processor. The at least one processor is configured to: receive a control channel transmission including channel state information reference signal (CSI-RS) resource configuration information from a second network node; determine, for a subband full-duplex (SBFD) slot, a ZP-CSI-RS resources based on CSI-RS frequency resource information, wherein the CSI-RS frequency resource information is determined based on the CSI-RS resource configuration information, and wherein the ZP-CSI-RS resources occupy two or more downlink (DL) subbands of the SBFD slot; and receive, in the subband full-duplex (SBFD) slot, a transmission from the second network node based on the CSI-RS frequency resource information, wherein the transmission is received in resources separate from the ZP-CSI-RS resources. In such CSI-IM or ZP-CSI-RS implementations, the corresponding CSI resources may not be determined based on sequence information as there is no transmission, such as no reference signal transmission.

In an additional aspect of the disclosure, an apparatus includes at least one processor and a memory coupled to the at least one processor. The at least one processor is configured to: receive a control channel transmission including channel state information reference signal (CSI-RS) resource configuration information from a second network node wherein the CSI-RS resource configuration information indicates allocated CSI-RS resources for CSI-RS transmissions; and receive, in a subband full-duplex (SBFD) slot, a CSI-RS transmission from the second network node based on CSI-RS frequency resource information, wherein the CSI-RS frequency resource information is determined based on the CSI-RS resource configuration information and on slot type information and indicates a subset of CSI-RS resources of the allocated CSI-RS resources for CSI-RS transmissions for the CSI-RS transmission, and wherein the CSI-RS resources for the CSI-RS transmission occupy two or more downlink (DL) subbands of the SBFD slot.

In an additional aspect of the disclosure, an apparatus includes at least one processor and a memory coupled to the at least one processor. The at least one processor is configured to: receive a control channel transmission including channel state information reference signal (CSI-RS) resource configuration information from a second network node, wherein the CSI-RS resource configuration information includes resource block granularity information for CSI-RS in subband full-duplex (SBFD) slots; and receive, in a SBFD slot, a CSI-RS transmission from the second network node based on the resource block granularity information for CSI-RS in SBFD slot, and wherein CSI-RS resources of the CSI-RS transmission occupy two or more downlink (DL) subbands of the SBFD slot.

In an additional aspect of the disclosure, an apparatus includes at least one processor and a memory coupled to the at least one processor. The at least one processor is configured to: receive a control channel transmission including channel state information reference signal (CSI-RS) resource configuration information from a second network node; and receive, in a subband full-duplex (SBFD) slot, a CSI-RS transmission from the second network node based on CSI-RS sequence information, wherein the CSI-RS sequence information is determined based on the CSI-RS resource configuration information, and wherein CSI-RS resources of the CSI-RS transmission occupy two or more downlink (DL) subbands of the SBFD slot.

Accordingly, a UE and a base station may perform enhanced CSI-RS configuration operations for SBFD slots. By performing enhanced CSI-RS configuration operations for SBFD slots, CSI-RS configuration and operations can be extended to SBFD operations and provide more flexible CSI-RS which can increase throughput and reliability and reduce network overhead.

Figure 13:
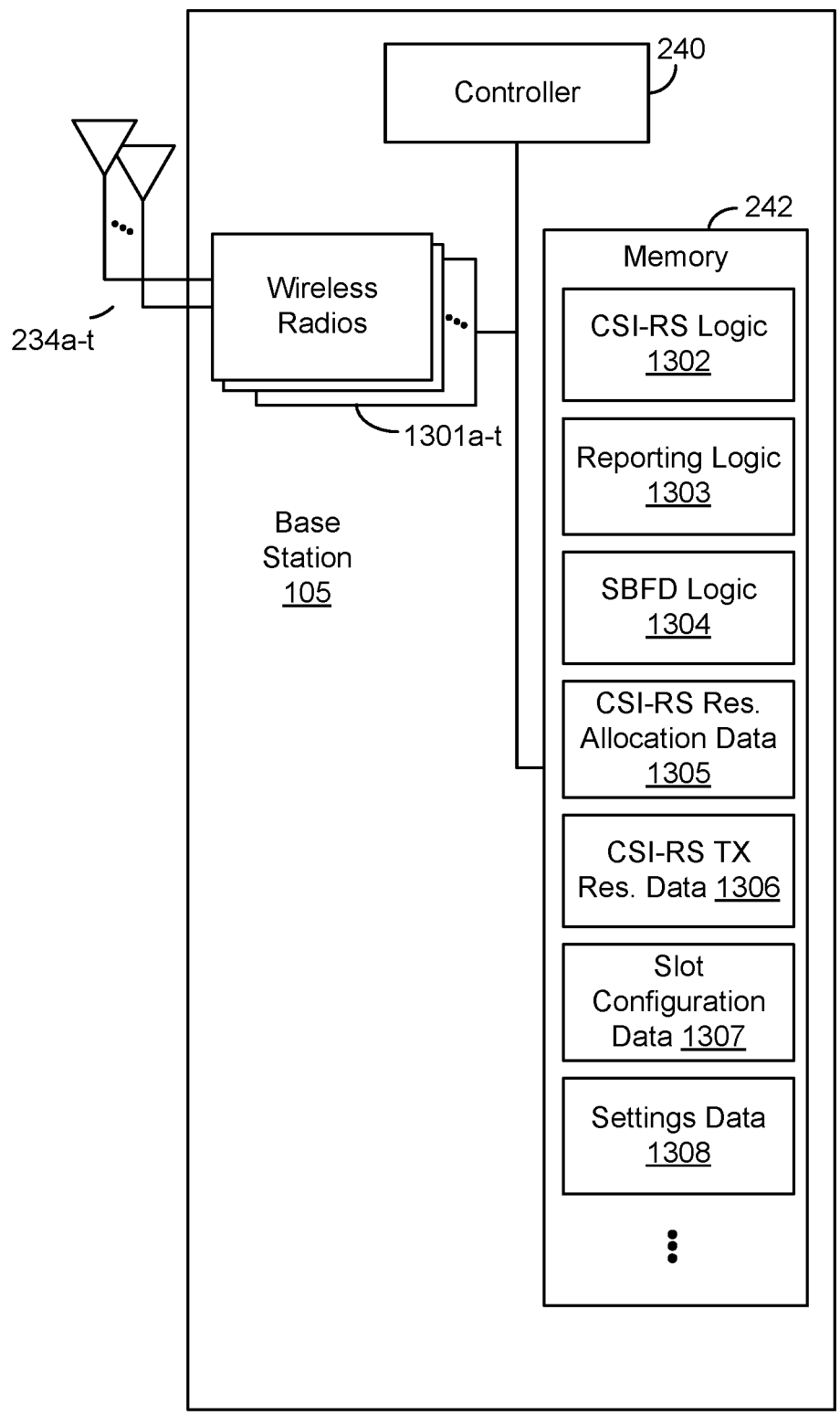
FIG. 13 is a block diagram of an example base station that supports enhanced CSI SBFD operations according to one or more aspects.

FIG. 11 is a flow diagram illustrating example blocks executed by wireless communication device configured according to another aspect of the present disclosure. The example blocks will also be described with respect to base station 105 (e.g., gNB) as illustrated in FIG. 13. FIG. 13 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1301*a-t* and antennas 234*a-t*. Wireless radios 1301*a-t* includes various components and hardware, as illustrated in FIG. 2 for base station 105, including modulator/demodulators 232*a-t*, MIMO detector 236, receive processor 238, transmit processor 220, and TX MIMO processor 230. As illustrated in the example of FIG. 13, memory 242 stores CSI-RS logic 1302, reporting logic 1303, SBFD logic 1304, CSI-RS resource allocation data 1305, CSI-RS transmission resource data 1306, slot configuration data 1307, and settings data 1308. One of more of 1302-1308 may include or correspond to one of 1202-1208.

At block 1100, a wireless communication device, such as a base station, transmits a control channel transmission including channel state information reference signal (CSI-RS) resource configuration information from a second network node. For example, the base station 105 transmits the control channel transmission 452 including the CSI-RS resource configuration information 406 of FIG. 4 to the UE 115, as described with reference to FIG. 4. To illustrate, the base station 105 may transmit a RRC transmission including a CSI-RS configuration information element which allocates CSI frequency resources for multiple CSI types, as described with reference to FIG. 4. Alternatively, the information may be in DCI or MAC CE or in multiple transmissions. The CSI-RS resource configuration information may include or correspond to the CSI-RS resource configuration information 406 of FIG. 4 or one of the CSI or CSI-RS resource allocations of FIGS. 6A-9. The second network node may include or correspond to a UE, such as UE 115.

At block 1101, the base station 105 transmits, in a subband full-duplex (SBFD) slot, a CSI-RS transmission from the second network node based on CSI-RS sequence information, CSI-RS frequency resource information, or both. The CSI-RS sequence information, the CSI-RS frequency resource information, or both, are determined based on the CSI-RS resource configuration information, and CSI-RS resources of the CSI-RS transmission occupy two or more downlink subbands of the SBFD slot. For example, the base station 105 transmits a CSI-RS transmission 456 to the UE 115 based on CSI-RS sequence information, CSI-RS frequency resource information, or both. To illustrate, the base station 105 determines the CSI-RS sequence information, the CSI-RS frequency resource information, or both, based on the CSI-RS resource configuration information 406 included in the control channel transmission 452, and determines specific CSI-RS transmission resources or CSI resources (e.g., 812*a*-812*c*, 814*a*-814*c*) for a particular slot based on the CSI-RS sequence information, the CSI-RS frequency resource information, and the slot information (e.g., slot configuration), as described with reference to FIGS. 4-9.

The CSI-RS sequence information may include or correspond to the scrambling ID and/or sequence ID information described with reference to FIGS. 4, 6A 6B, and 9. The CSI-RS frequency resource information may include or correspond to the CSI-RS resource allocation information 408 and/or the CSI-RS transmission resource information 442 (e.g., CSI-RS transmission resource information) and may be determined based on the CSI-RS resource configuration information 406 of FIG. 8 or one of the CSI or CSI-RS resource allocations of FIGS. 6A-9. As an illustrative example, the CSI-RS frequency resource information may include or correspond to a number of RBs and a starting RB, a granularity for RBs of RBGs for CSI-RS resources, a condition for dealing with partial or full overlaps, a condition of whether CSI-RS resources can overlap a guardband, etc., and may enable determination of a subset of resources for a CSI transmission or event in a particular slot (e.g., SBFD slots) of allocated CSI-RS resources for all slots or all slots of a particular type (e.g., HD slots or FD slots, or a FD CSI resource configuration), or a combination thereof.

The base station 105 may execute additional blocks (or the base station 105 may be configured further perform additional operations) in other implementations. For example, the base station 105 may perform one or more operations described above. As another example, the base station 105 may perform one or more aspects as described below.

In a first aspect, the CSI-RS resources of the CSI transmission correspond to a single contiguous set of CSI-RS resources occupying the two or more DL subbands.

In a second aspect, alone or in combination with one or more of the above aspects, the CSI-RS resources of the CSI transmission correspond to a single non-contiguous set of CSI-RS resources occupying the two or more DL subbands.

In a third aspect, alone or in combination with one or more of the above aspects, the CSI-RS resources of the CSI transmission correspond to two separate and contiguous sets of CSI-RS resource, each set of CSI-RS resources occupying a corresponding DL subband of the two or more DL subbands.

In a fourth aspect, alone or in combination with one or more of the above aspects, the CSI-RS frequency resource information comprises resource block granularity information for CSI-RS resources in SBFD, resource block information for CSI-RS transmissions, or both.

In a fifth aspect, alone or in combination with one or more of the above aspects, the CSI-RS sequence information comprises a sequence identifier and is determined based on one or more scrambling identifiers indicated by the CSI-RS resource configuration information.

In a sixth aspect, alone or in combination with one or more of the above aspects, the at least one processor is configured to: transmit a second control channel transmission including a CSI-RS trigger indication for the CSI-RS transmission; and determine the SBFD slot for the CSI-RS transmission based on a slot of the second control channel transmission and offset information of the CSI-RS resource configuration information.

In a seventh aspect, alone or in combination with one or more of the above aspects, the CSI-RS resource configuration information indicates a number of CSI-RS resource blocks for CSI-RS transmissions and a starting resource block for the CSI-RS transmissions.

In an eighth aspect, alone or in combination with one or more of the above aspects, the at least one processor is configured to: determine the CSI-RS sequence information, CSI-RS frequency resource information, or both, based on the CSI-RS resource configuration information; determine a location of the CSI-RS resources of the CSI-RS transmission in the DL subbands based on the CSI-RS sequence information, CSI-RS frequency resource information, or both, and receive a CSI report based on measured CSI-RS resources.

In a ninth aspect, alone or in combination with one or more of the above aspects, the CSI-RS comprises a non-zero power CSI-RS (NZP-CSI-RS).

In a tenth aspect, alone or in combination with one or more of the above aspects, a slot configuration of the SBFD slot has two downlink subbands separated by an uplink subband.

In an eleventh aspect, alone or in combination with one or more of the above aspects, the CSI-RS resource configuration information indicates frequency resources allocated for CSI-RS transmissions, wherein the CSI-RS resources of the CSI-RS transmission correspond to a subset of frequency resources of the frequency resources allocated for CSI-RS transmissions.

In a twelfth aspect, alone or in combination with one or more of the above aspects, the at least one processor is configured to: transmit slot type information; and interpret CSI-RS resource allocation information of the CSI-RS resource configuration information based on the slot type information to determine the CSI-RS resources of the CSI-RS transmission.

In a thirteenth aspect, alone or in combination with one or more of the above aspects, to interpret the CSI-RS resource allocation information includes to: determine a set of CSI-RS resources allocated for full-duplex operation as allocated CSI-RS resources based on the CSI-RS resource allocation information; determine CSI-RS resources of the allocated CSI-RS resources which overlap any UL subband and optionally any guardband between the UL subband and the two or more downlink subbands based on the slot type information; and puncture the determined CSI-RS resources which overlap the UL subband and optionally the guardbands from the allocated CSI-RS resources to determine the CSI-RS resources of the CSI-RS transmission and which occur in the two or more DL subbands, wherein the second network node monitors the CSI-RS resources of the CSI-RS transmission and does not monitor the determined CSI-RS resources of the allocated CSI-RS resources.

In a fourteenth aspect, alone or in combination with one or more of the above aspects, to puncture the determined CSI-RS resources from the allocated CSI-RS resources to determine the CSI-RS resources of the CSI-RS transmission includes to puncture independent of CSI-RS resource block granularity information.

In a fifteenth aspect, alone or in combination with one or more of the above aspects, to puncture the determined CSI-RS resources from the allocated CSI-RS resources to determine the CSI-RS resources of the CSI-RS transmission includes to puncture further based on CSI-RS resource block granularity information, and wherein each set of resource blocks of the allocated CSI-RS resources which only partially overlap a downlink subband of the two or more downlink subband are punctured.

In a sixteenth aspect, alone or in combination with one or more of the above aspects, the CSI-RS resources are non-contiguous, and to interpret the CSI-RS resource allocation information includes to: determine a set of CSI-RS resources allocated for full-duplex operation as allocated CSI-RS resources based on the CSI-RS resource allocation information; determine whether any CSI-RS resources of the allocated CSI-RS resources overlap any UL subband and optionally any guardband between the UL subband and the two or more downlink subbands based on the slot type information; and determine the allocated CSI-RS resources as the CSI-RS resources of the CSI-RS transmission based on determining that no CSI-RS resources of the allocated CSI-RS resources overlap, wherein the second network node monitors the allocated CSI-RS resources.

In a seventeenth aspect, alone or in combination with one or more of the above aspects, the CSI-RS resources are non-contiguous, and wherein to interpret the CSI-RS resource allocation information includes to: determine a set of CSI-RS resources allocated for full-duplex operation as allocated CSI-RS resources based on the CSI-RS resource allocation information; determine CSI-RS resources of the allocated CSI-RS resources which overlap any UL subband and optionally any guardband between the UL subband and the two or more downlink subbands based on the slot type information; and truncate the determined CSI-RS resources which overlap the UL subband and optionally the guardbands from the allocated CSI-RS resources to determine the CSI-RS resources of the CSI-RS transmission and which occur in the two or more DL subbands, wherein the second network node monitors the CSI-RS resources of the CSI-RS transmission and does not monitor the determined CSI-RS resources of the allocated CSI-RS resources.

In an eighteenth aspect, alone or in combination with one or more of the above aspects, to truncate the determined CSI-RS resources from the allocated CSI-RS resources to determine the CSI-RS resources of the CSI-RS transmission includes to truncate further based on CSI-RS resource block granularity information, and wherein the CSI-RS resource block granularity information indicates a granularity of a single resource block.

In a nineteenth aspect, alone or in combination with one or more of the above aspects, the CSI-RS resource configuration information comprises a minimum CSI-RS bandwidth configuration for SBFD.

In a twentieth aspect, alone or in combination with one or more of the above aspects, the minimum CSI-RS bandwidth configuration for SBFD is a minimum configuration of resource blocks per DL subband after truncation or puncturing for any UL subbands, guardbands, or both.

In a twenty-first aspect, alone or in combination with one or more of the above aspects, the minimum CSI-RS bandwidth configuration for SBFD is a minimum configuration of resource blocks for all DL subbands after truncation or puncturing for any UL subbands, guardbands, or both.

In a twenty-second aspect, alone or in combination with one or more of the above aspects, the CSI-RS resources are determined based on one sequence ID.

In a twenty-third aspect, alone or in combination with one or more of the above aspects, the CSI-RS resources are determined based on two sequence IDs.

In a twenty-fourth aspect, alone or in combination with one or more of the above aspects, the CSI-RS resource configuration information indicates a single scrambling ID, and the at least one processor is configured to: determine a sequence ID based on a single scrambling ID; determine that the CSI-RS resources of the CSI-RS transmission are in a first DL subband and a second DL subband of the two or more DL subbands based on the sequence ID.

In a twenty-fifth aspect, alone or in combination with one or more of the above aspects, to determine the CSI-RS resources in the first DL subband and the second DL subband based on the sequence ID includes to: determine the CSI-RS resources in an uplink band, one or more guardbands, or a combination thereof, based on the sequence ID; and puncture or truncate the determined CSI-RS resources in the UL and GB bands to determine the CSI-RS resources in the first DL subband and the second DL subband, wherein the CSI-RS resources in the first DL subband and the second DL subband correspond to the CSI-RS resources of the CSI-RS transmission.

In a twenty-sixth aspect, alone or in combination with one or more of the above aspects, the CSI-RS resource configuration information indicates two scrambling IDs, and wherein the at least one processor is configured to: determine a first sequence ID based on a first scrambling ID determine a second sequence ID based on the second scrambling ID; determine the CSI-RS resources in a first DL subband of the two or more DL subbands based on the first sequence ID; and determine the CSI-RS resources in a second DL subband of the two or more DL subbands based on the second sequence ID.

In a twenty-seventh aspect, alone or in combination with one or more of the above aspects, a CSI-RS resource block granularity is 4 RBs (e.g., in full-duplex (FD) and half-duplex (HD) modes), and a DL subband resource block granularity is 1 RB.

In a twenty-eighth aspect, alone or in combination with one or more of the above aspects, a CSI-RS resource block granularity is 1 RB, and a DL subband resource block granularity is 1 RB.

In a twenty-ninth aspect, alone or in combination with one or more of the above aspects, the CSI-RS resource configuration information includes configuration information for all CSI types (e.g., ZP, NZP, CSI-IM, etc.). In some such implementations, the configurations for all three CSI types are the same. In some other implementations, the configuration for one or more CSI types are different. For example, all three CSI types may allow RBs in DL only, and one CSI type (e.g., CSI-IM) may also allow RBs (e.g., monitoring for interference for CSI-IM) in guardbands as well as DL subbands.

In an additional aspect of the disclosure, an apparatus includes at least one processor and a memory coupled to the at least one processor. The at least one processor is configured to: transmit a control channel transmission including channel state information reference signal (CSI-RS) resource configuration information from a second network node; and receive CSI-IM information based on interference measurements, by the second network node, of CSI-IM resources in a SBFD slot and determined based on CSI-RS frequency resource information, wherein the CSI-RS frequency resource information is determined based on the CSI-RS resource configuration information, and wherein the CSI-IM resources occupy two or more downlink (DL) subbands of the SBFD slot.

In an additional aspect of the disclosure, an apparatus includes at least one processor and a memory coupled to the at least one processor. The at least one processor is configured to: transmit a control channel transmission including channel state information reference signal (CSI-RS) resource configuration information from a second network node; determine, for a subband full-duplex (SBFD) slot, a ZP-CSI-RS resources based on CSI-RS frequency resource information, wherein the CSI-RS frequency resource information is determined based on the CSI-RS resource configuration information, and wherein the ZP-CSI-RS resources occupy two or more downlink (DL) subbands of the SBFD slot; and transmit, in the subband full-duplex (SBFD) slot, a transmission based on the CSI-RS frequency resource information, wherein the transmission is transmitted in resources separate from the ZP-CSI-RS resources. In such CSI-IM or ZP-CSI-RS implementations, the corresponding CSI resources may not be determined based on sequence information as there is no transmission, such as no reference signal transmission.

In an additional aspect of the disclosure, an apparatus includes at least one processor and a memory coupled to the at least one processor. The at least one processor is configured to: transmit a control channel transmission including channel state information reference signal (CSI-RS) resource configuration information from a second network node wherein the CSI-RS resource configuration information indicates allocated CSI-RS resources for CSI-RS transmissions; and transmit, in a subband full-duplex (SBFD) slot, a CSI-RS transmission from the second network node based on CSI-RS frequency resource information, wherein the CSI-RS frequency resource information is determined based on the CSI-RS resource configuration information and on slot type information and indicates a subset of CSI-RS resources of the allocated CSI-RS resources for CSI-RS transmissions for the CSI-RS transmission, and wherein the CSI-RS resources for the CSI-RS transmission occupy two or more downlink (DL) subbands of the SBFD slot.

In an additional aspect of the disclosure, an apparatus includes at least one processor and a memory coupled to the at least one processor. The at least one processor is configured to: transmit a control channel transmission including channel state information reference signal (CSI-RS) resource configuration information from a second network node, wherein the CSI-RS resource configuration information includes resource block granularity information for CSI-RS in subband full-duplex (SBFD) slots; and transmit, in a SBFD slot, a CSI-RS transmission from the second network node based on the resource block granularity information for CSI-RS in SBFD slot, and wherein CSI-RS resources of the CSI-RS transmission occupy two or more downlink (DL) subbands of the SBFD slot.

In an additional aspect of the disclosure, an apparatus includes at least one processor and a memory coupled to the at least one processor. The at least one processor is configured to: transmit a control channel transmission including channel state information reference signal (CSI-RS) resource configuration information from a second network node; and transmit, in a subband full-duplex (SBFD) slot, a CSI-RS transmission from the second network node based on CSI-RS sequence information, wherein the CSI-RS sequence information is determined based on the CSI-RS resource configuration information, and wherein CSI-RS resources of the CSI-RS transmission occupy two or more downlink (DL) subbands of the SBFD slot.

Accordingly, a UE and a base station may perform enhanced CSI-RS configuration operations for SBFD slots. By performing enhanced CSI-RS configuration operations for SBFD slots, CSI-RS configuration and operations can be extended to SBFD operations and provide more flexible CSI-RS which can increase throughput and reliability and reduce network overhead.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first network node for wireless communication, comprising:
    at least one processor; and
    a memory coupled to the at least one processor,
    wherein the at least one processor is configured to:
        receive a control channel transmission including channel state information reference signal (CSI-RS) resource configuration information from a second network node; and
        receive, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot and are determined based on slot type information, and wherein the CSI-RS resources of the CSI transmission correspond to a single non-contiguous set of CSI-RS resources occupying the two or more DL subbands.

2. The first network node of claim 1, wherein the CSI-RS resources of the CSI transmission correspond to a single contiguous set of CSI-RS resources occupying the two or more DL subbands, and wherein the CSI-RS resources of the CSI-RS transmission are determined by interpreting CSI-RS resource allocation information of the CSI-RS resource configuration information based on the slot type information.

3. The first network node of claim 1, wherein the CSI-RS resources of the CSI transmission correspond to two separate and contiguous sets of CSI-RS resource, each set of CSI-RS resources occupying a corresponding DL subband of the two or more DL subbands.

4. The first network node of claim 1, wherein the CSI-RS frequency resource information comprises resource block granularity information for CSI-RS resources in SBFD, resource block information for CSI-RS transmissions, or both.

5. The first network node of claim 1, wherein the CSI-RS sequence information comprises a sequence identifier and is determined based on one or more scrambling identifiers indicated by the CSI-RS resource configuration information.

6. The first network node of claim 1, wherein the at least one processor is configured to:
    receive a second control channel transmission including a CSI-RS trigger indication for the CSI-RS transmission; and
    determine the SBFD slot for the CSI-RS transmission based on a slot of the second control channel transmission and offset information of the CSI-RS resource configuration information.

7. The first network node of claim 1, wherein the CSI-RS resource configuration information indicates a number of CSI-RS resource blocks for CSI-RS transmissions and a starting resource block for the CSI-RS transmissions.

8. The first network node of claim 1, wherein the at least one processor is configured to:
    determine the CSI-RS sequence information, CSI-RS frequency resource information, or both, based on the CSI-RS resource configuration information;
    determine a location of the CSI-RS resources of the CSI-RS transmission in the DL subbands based on the CSI-RS sequence information, CSI-RS frequency resource information, or both;
    measure the CSI-RS resources of the CSI-RS transmission from the second network node; and
    transmit a CSI report based on the measured CSI-RS resources.

9. The first network node of claim 1, wherein the CSI-RS comprises a Non-zero power CSI-RS (NZP-CSI-RS).

10. The first network node of claim 1, where a slot configuration of the SBFD slot has two downlink subbands separated by an uplink subband.

11. The first network node of claim 1, wherein the CSI-RS resource configuration information indicates frequency resources allocated for CSI-RS transmissions, wherein the CSI-RS resources of the CSI-RS transmission correspond to a subset of frequency resources of the frequency resources allocated for CSI-RS transmissions.

12. The first network node of claim 1, wherein the at least one processor is configured to:
    receive the slot type information for the SBFD slot; and
    interpret CSI-RS resource allocation information of the CSI-RS resource configuration information based on the slot type information to determine the CSI-RS resources of the CSI-RS transmission.

13. The first network node of claim 12, wherein to interpret the CSI-RS resource allocation information includes:
    determine a set of CSI-RS resources allocated for full-duplex operation as allocated CSI-RS resources based on the CSI-RS resource allocation information;
    determine CSI-RS resources of the allocated CSI-RS resources which overlap any UL subband and optionally any guardband between the UL subband and the two or more downlink subbands based on the slot type information; and
    puncture the determined CSI-RS resources which overlap the UL subband and optionally the guardbands from the allocated CSI-RS resources to determine the CSI-RS resources of the CSI-RS transmission and which occur in the two or more DL subbands, wherein the first network node monitors the CSI-RS resources of the CSI-RS transmission and does not monitor the determined CSI-RS resources of the allocated CSI-RS resources.

14. The first network node of claim 13, wherein to puncture the determined CSI-RS resources from the allocated CSI-RS resources to determine the CSI-RS resources of the CSI-RS transmission includes to puncture independent of CSI-RS resource block granularity information.

15. The first network node of claim 13, wherein to puncture the determined CSI-RS resources from the allocated CSI-RS resources to determine the CSI-RS resources of the CSI-RS transmission includes to puncture further based on CSI-RS resource block granularity information, and wherein each set of resource blocks of the allocated CSI-RS resources which only partially overlap a downlink subband of the two or more downlink subband are punctured.

16. The first network node of claim 12, wherein the CSI-RS resources are non-contiguous, and wherein to interpret the CSI-RS resource allocation information includes:
   determine a set of CSI-RS resources allocated for full-duplex operation as allocated CSI-RS resources based on the CSI-RS resource allocation information;
   determine whether any CSI-RS resources of the allocated CSI-RS resources overlap any UL subband and optionally any guardband between the UL subband and the two or more downlink subbands based on the slot type information; and
   determine the allocated CSI-RS resources as the CSI-RS resources of the CSI-RS transmission based on determining that no CSI-RS resources of the allocated CSI-RS resources overlap, wherein the first network node monitors the allocated CSI-RS resources.

17. The first network node of claim 12, wherein the CSI-RS resources are non-contiguous, and wherein to interpret the CSI-RS resource allocation information includes:
   determine a set of CSI-RS resources allocated for full-duplex operation as allocated CSI-RS resources based on the CSI-RS resource allocation information;
   determine CSI-RS resources of the allocated CSI-RS resources which overlap any UL subband and optionally any guardband between the UL subband and the two or more downlink subbands based on the slot type information; and
   truncate the determined CSI-RS resources which overlap the UL subband and optionally the guardbands from the allocated CSI-RS resources to determine the CSI-RS resources of the CSI-RS transmission and which occur in the two or more DL subbands, wherein the first network node monitors the CSI-RS resources of the CSI-RS transmission and does not monitor the determined CSI-RS resources of the allocated CSI-RS resources.

18. The first network node of claim 17, wherein to truncate the determined CSI-RS resources from the allocated CSI-RS resources to determine the CSI-RS resources of the CSI-RS transmission includes to truncate further based on CSI-RS resource block granularity information, and wherein the CSI-RS resource block granularity information indicates a granularity of a single resource block.

19. The first network node of claim 1, wherein the CSI-RS resource configuration information comprises a minimum CSI-RS bandwidth configuration for SBFD.

20. The first network node of claim 19, wherein the minimum CSI-RS bandwidth configuration for SBFD is a minimum configuration of resource blocks per DL subband after truncation or puncturing for any UL subbands, guardbands, or both.

21. The first network node of claim 19, wherein the minimum CSI-RS bandwidth configuration for SBFD is a minimum configuration of resource blocks for all DL subbands after truncation or puncturing for any UL subbands, guardbands, or both.

22. The first network node of claim 1, wherein the CSI-RS resources are determined based on one sequence ID.

23. The first network node of claim 1, wherein the CSI-RS resources are determined based on two sequence IDs.

24. The first network node of claim 1, wherein the CSI-RS resource configuration information indicates a single scrambling ID, and wherein the at least one processor is configured to:
   determine a sequence ID based on a single scrambling ID; and
   determine that the CSI-RS resources of the CSI-RS transmission are in a first DL subband and a second DL subband of the two or more DL subbands based on the sequence ID.

25. The first network node of claim 24, wherein to determine the CSI-RS resources in the first DL subband and the second DL subband based on the sequence ID includes to:
   determine the CSI-RS resources in an uplink (UL) subband, one or more guardbands, or a combination thereof, based on the sequence ID; and
   puncture or truncate the determined CSI-RS resources in the UL subband and the one or more guardbands to determine the CSI-RS resources in the first DL subband and the second DL subband, wherein the CSI-RS resources in the first DL subband and the second DL subband correspond to the CSI-RS resources of the CSI-RS transmission.

26. The first network node of claim 1, wherein the CSI-RS resource configuration information indicates two scrambling IDs, and wherein the at least one processor is configured to:
   determine a first sequence ID based on a first scrambling ID
   determine a second sequence ID based on the second scrambling ID;
   determine the CSI-RS resources in a first DL subband of the two or more DL subbands based on the first sequence ID; and
   determine the CSI-RS resources in a second DL subband of the two or more DL subbands based on the second sequence ID.

27. A first network node for wireless communication, comprising:
   at least one processor; and
   a memory coupled to the at least one processor,
   wherein the at least one processor is configured to:
      transmit a control channel transmission including channel state information reference signal (CSI-RS) resource configuration information from a second network node; and
      transmit, in a subband full-duplex (SBFD) slot, a CSI-RS transmission from the second network node based on CSI-RS sequence information, CSI-RS frequency resource information, or both, wherein the CSI-RS sequence information, the CSI-RS frequency resource information, or both, are determined based on the CSI-RS resource configuration information, and wherein CSI-RS resources of the CSI-RS transmission occupy two or more downlink (DL) subbands of the SBFD slot and are determined based on slot type information, and wherein the CSI-RS resources of the CSI transmission correspond to a single non-contiguous set of CSI-RS resources occupying the two or more DL subbands.

\* \* \* \* \*